(12) United States Patent
Maehara et al.

(10) Patent No.: US 8,973,354 B2
(45) Date of Patent: Mar. 10, 2015

(54) EXHAUST SYSTEM FOR VARIABLE CYLINDER ENGINE

(71) Applicant: Honda Motor Co., Ltd., Tokyo (JP)

(72) Inventors: Hayato Maehara, Wako (JP); Shigehiro Yamaguchi, Wako (JP); Norihiko Gogami, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 110 days.

(21) Appl. No.: 13/720,297

(22) Filed: Dec. 19, 2012

(65) Prior Publication Data

US 2013/0255237 A1 Oct. 3, 2013

(30) Foreign Application Priority Data

Mar. 28, 2012 (JP) ................................ 2012-074777
Mar. 28, 2012 (JP) ................................ 2012-074778

(51) Int. Cl.

| F01N 3/28 | (2006.01) |
|---|---|
| F02M 35/108 | (2006.01) |
| F01N 3/10 | (2006.01) |
| F01N 3/34 | (2006.01) |
| F01N 13/10 | (2010.01) |

(Continued)

(52) U.S. Cl.
CPC ............... *F02M 35/108* (2013.01); *F01N 3/10* (2013.01); *F01N 3/28* (2013.01); *F01N 3/34* (2013.01); *F01N 13/107* (2013.01); *F02D 17/02* (2013.01); *F01N 13/009* (2013.01); *F01N 2590/04* (2013.01); *Y02T 10/20* (2013.01)
USPC ................... 60/299; 60/323; 60/324

(58) Field of Classification Search
CPC . F01N 13/009; F01N 13/107; F01N 2340/02; F01N 2340/04; F01N 2470/16; F01N 2590/04; F01N 3/2842; F01N 3/2892; F02D 1/0082
USPC .................... 60/285, 299, 323, 324
See application file for complete search history.

(56) References Cited

U.S. PATENT DOCUMENTS

| 4,215,093 A | * | 7/1980 | Yasuda ......................... 422/179 |
| 4,274,373 A | * | 6/1981 | Sugasawa et al. .............. 60/276 |
| 5,365,735 A | * | 11/1994 | Weber et al. .................... 60/323 |

(Continued)

FOREIGN PATENT DOCUMENTS

| JP | 7-133716 A | 5/1995 |
| JP | 2002-349304 A | 12/2002 |

*Primary Examiner* — Thomas Denion
*Assistant Examiner* — Jorge Leon, Jr.
(74) *Attorney, Agent, or Firm* — Birch, Stewart, Kolasch & Birch, LLP

(57) ABSTRACT

An exhaust system for a variable cylinder engine for assuring purification of exhaust gas without increasing the number of catalysts and an intake system for purifying blow-by gas. The exhaust system includes an activation side exhaust pipe connected to an activation cylinder group that operates normally. A deactivation side exhaust pipe is connected to a deactivation cylinder group wherein fuel supply is stopped under a particular condition. A gathering section is connected to downstream ends of the activation side exhaust pipe and the deactivation side exhaust pipe with a sub-catalyst disposed in the activation side exhaust pipe and a main catalyst disposed at the gathering section. The main catalyst is formed wherein gas passing therethrough is partitioned into flows independent of each other in a flow path direction. The activation side exhaust pipe and the deactivation side exhaust pipe are connected in a mutually independent state to the main catalyst.

8 Claims, 16 Drawing Sheets

(51) Int. Cl.
*F02D 17/02* (2006.01)
*F01N 13/00* (2010.01)

(56) References Cited

U.S. PATENT DOCUMENTS

| | | | |
|---|---|---|---|
| 5,438,828 A * | 8/1995 | Fukae | 60/302 |
| 2001/0035155 A1 * | 11/2001 | Uegane et al. | 123/322 |
| 2002/0002824 A1 * | 1/2002 | Hirota et al. | 60/297 |
| 2002/0189592 A1 | 12/2002 | Nishigaki | |
| 2009/0282807 A1 * | 11/2009 | Rioli et al. | 60/276 |
| 2009/0301060 A1 * | 12/2009 | Kennie et al. | 60/285 |
| 2010/0024399 A1 * | 2/2010 | Demura | 60/285 |
| 2011/0283688 A1 * | 11/2011 | Yuda | 60/300 |

* cited by examiner ated to the main catalyst. Japanese Patent Laid-Open No. Hei
EXHAUST SYSTEM FOR VARIABLE CYLINDER ENGINE

CROSS-REFERENCE TO RELATED APPLICATIONS

The present application claims priority under 35 USC 119 to Japanese Patent Application No. 2012-074777 filed Mar. 28, 2012 Japanese Patent Application No. 2012-074778 filed Mar. 28, 2012 the entire contents of which are hereby incorporated by reference.

BACKGROUND OF THE INVENTION

1. Field of the Invention

The present invention relates to an exhaust and an intake system for a variable cylinder engine.

2. Description of Background Art

A conventional exhaust system for a variable cylinder engine is known that carries out a cylinder deactivation operation without deactivating an intake valve and an exhaust valve of some cylinders. See, for example, Japanese Patent Laid-Open No. Hei 7-133716. In the conventional exhaust system for a variable cylinder engine, exhaust pipes of activation cylinders and exhaust pipes of deactivation cylinders are gathered and a main catalyst is disposed on the downstream side of the gathering section. Further, a pre-catalyst is disposed in the exhaust pipes of the activation cylinders on the upstream side of the gathering section. Exhaust gas from the activation cylinders is purified by the pre-catalysts first, and then exhaust gas including unburned components that have not been purified by the pre-catalysts is joined to fresh air from the deactivation cylinders and then purified again by the main catalyst. Consequently, a purification performance is assured and a temperature drop of the main catalyst is suppressed.

If the exhaust system for a variable cylinder engine disclosed in Japanese Patent Laid-Open No. Hei 7-133716 above is adopted, then the temperature drop of the main catalyst can be suppressed. However, CO and $H_2O$ included in exhaust gas in the activation cylinders react in the pre-catalysts to produce $H_2$, and this $H_2$ sometimes reacts with NO included in the exhaust gas similarly to produce $NH_3$. Further, if this $NH_3$ is joined and reacts with fresh air in the main catalyst, then this is oxidized back into NO. Therefore, there is a problem that NO is exhausted to the downstream side of the main catalyst. Japanese Patent Laid-Open No. Hei 7-133716 describes that, as a countermeasure against this problem, a sub-catalyst is additionally provided on the downstream side of the main catalyst. However, since an increase in the number of catalyst gives rise to an increase in the cost, a requirement to assure a purification performance without increasing the number of catalysts is desired.

In addition, a variable cylinder engine is known wherein some cylinders are deactivated only by cutting fuel supply and ignition without deactivating intake valves and exhaust valves. See, for example, Japanese Patent Laid-Open No. 2002-349304. Further, a crankcase emission controlling apparatus is known wherein blow-by gas generated in a crankcase of an engine is introduced from a throttle apparatus into an air cleaner on the upstream side to return the blow-by gas into the combustion chamber together with intake air to combust the blow-by gas thereby to prevent the blow-by gas from being emitted to the atmospheric air.

Further, if the crankcase emission controlling apparatus described above is incorporated into the variable cylinder engine disclosed in Japanese Patent Laid-Open No. 2002-349304 specified above and an intake passage of an activation cylinder group and an intake passage of a deactivation cylinder group are connected to a single air cleaner, then there is the following possibility. In particular, upon deactivation of the cylinder operation, there is the possibility that blow-by gas introduced into the air cleaner may pass through the deactivation cylinder group, in which no combustion occurs, and then be emitted into the atmospheric air while it remains unburnt.

SUMMARY AND OBJECTS OF THE INVENTION

The present invention has been made in view of such a situation as described above. It is an object of an embodiment of the present invention to provide an exhaust system for a variable cylinder engine that can assure a purification performance of exhaust gas without increasing the number of catalysts.

In order to attain the object described above, according to an embodiment of the present invention, there is provided an exhaust system for a variable cylinder engine that includes a variable cylinder engine having an activation cylinder group that operates normally and a deactivation cylinder group in which fuel supply is stopped under a particular condition. An activation side exhaust pipe is connected to the activation cylinder group. A deactivation side exhaust pipe is connected to the deactivation cylinder group. A gathering section is connected to downstream ends of the activation side exhaust pipe and the deactivation side exhaust pipe with a sub-catalyst disposed in the activation side exhaust pipe and a main catalyst disposed at the gathering section wherein the main catalyst is formed such that gas passing therethrough is partitioned into flows independent of each other in a flow path direction. The activation side exhaust pipe and the deactivation side exhaust pipe are connected in a mutually independent state to the main catalyst.

According to an embodiment of the present invention, the main catalyst is formed in a flattened cross sectional shape in such a manner as to span in an array direction of the downstream ends of the activation side exhaust pipe and the deactivation side exhaust pipe.

According to an embodiment of the present invention, the downstream end of at least one of the activation side exhaust pipe and the deactivation side exhaust pipe is abutted with an upstream end of the main catalyst.

According to an embodiment of the present invention, the sub-catalyst includes an external cylinder member that configures a shell thereof, and a downstream end of the external cylinder member is abutted with an upstream end of the main catalyst.

According to an embodiment of the present invention, a partition wall that partitions the portion at which the activation side exhaust pipe is connected and the portion at which the deactivation side exhaust pipe is connected from each other is provided at the gathering section. In addition, a downstream end of the partition wall is abutted with an upstream end of the main catalyst.

According to an embodiment of the present invention, the activation side exhaust pipe includes a plurality of upstream side exhaust pipes connected to the cylinders of the activation cylinder group and an activation side gathering section connected to a downstream end of the upstream side exhaust pipes. In addition, the sub-catalyst is disposed at the activation side gathering section.

According to an embodiment of the present invention, the activation side gathering section is configured as a separate member from the upstream side exhaust pipes.

According to an embodiment of the present invention, the engine has a front cylinder block and a rear cylinder block disposed in a V-shape, the activation cylinder group is incorporated in the cylinder block, and the gathering section is disposed below the variable cylinder engine.

According to an embodiment of the present invention, the main catalyst is formed such that gas passing therethrough is partitioned into flows independent of each other in the flow path direction, and the activation side exhaust pipe and the deactivation side exhaust pipe are connected in a mutually independent state to the main catalyst. Therefore, exhaust gas of the activation cylinder group passing through the sub-catalyst and fresh air flowing from the deactivation cylinder group are not mixed on the upstream side of the main catalyst. Therefore, exhaust gas of the activation cylinder group passing through the sub-catalyst can be purified by the main catalyst, and consequently, production of NO at the gathering section can be suppressed. Accordingly, an exhaust gas purification performance of the exhaust system can be assured without increasing the number of catalysts.

According to an embodiment of the present invention, the main catalyst is formed in a flattened cross sectional shape such that it spans in the array direction of the downstream ends of the activation side exhaust pipe and the deactivation side exhaust pipe. Therefore, the whole quantity of exhaust gas from the activation side exhaust pipe and the deactivation side exhaust pipe can be introduced into the main catalyst. Consequently, the exhaust gas purification performance of the exhaust system can be assured by increasing the capacity of the main catalyst.

According to an embodiment of the present invention, since the downstream end of at least one of the activation side exhaust pipe and the deactivation side exhaust pipe abuts with the upstream end of the main catalyst, exhaust gas can be partitioned making use of the activation side exhaust pipe and the deactivation side exhaust pipe.

According to an embodiment of the present invention, since the downstream end of the external cylinder member which configures the shell of the sub-catalyst abuts with the upstream end of the main catalyst, exhaust gas can be partitioned making use of the sub-catalyst irrespective of the shape of the exhaust pipes. Further, the number of parts can be reduced.

According to an embodiment of the present invention, the partition wall that partitions the portion to which the activation side exhaust pipe is connected and the portion to which the deactivation side exhaust pipe is connected from each other is provided at the gathering section, and the downstream end of the partition wall is abutted with the upstream end of the main catalyst. Therefore, exhaust gas can be partitioned by the partition wall without changing the shape of conventional exhaust pipes.

According to an embodiment of the present invention, since the sub-catalyst is disposed at the activation side gathering section of the plurality of upstream side exhaust pipes connected to the cylinders of the activation cylinder group, there is no necessity to provide a sub-catalyst in conformity with the number of cylinders. Consequently, increase of the number of sub-catalysts can be suppressed.

According to an embodiment of the present invention, since the activation gathering section is configured as a separate member from the plurality of upstream side exhaust pipes, when the sub-catalyst is additionally provided. Thus, the design can be readily performed for the arrangement position and for the dimensions.

According to an embodiment of the present invention, since the gathering section is disposed below the variable cylinder engine, by using the main catalyst of a flattened cross sectional shape, the heightwise dimension of the gathering section can be suppressed to assure a minimum ground height of the motorcycle. Further, since the activation cylinder group is incorporated in the front cylinder block, the number of curved portions of the activation side exhaust pipes is smaller than that of the deactivation side exhaust pipe connected to the rear cylinder block. Thus, the arrangement of the sub-catalyst in the activation side exhaust pipe can be readily carried out.

In addition, in view of such a situation as described above with regard to the intake passage, and it is an object of an embodiment of the present invention to provide an intake system for a variable cylinder engine wherein blow-by gas introduced into an air cleaner is fed only into an activation cylinder group without being fed into a deactivation cylinder group so that the blow-by gas can be purified with certainty.

In order to attain the object described above, according to an embodiment of the present invention, there is provided an intake system for a variable cylinder engine that includes a variable cylinder engine having an activation cylinder group that is activated normally and a deactivation cylinder group where fuel supply is stopped under a particular condition. Throttle bodies are connected to the activation cylinder group and the deactivation cylinder group, respectively, and having an intake passage, the intake system includes an upstream side intake passage provided on the upstream side of the throttle bodies and having a single chamber. A partition wall partitions the chamber into a space on the activation cylinder group side and a space on the deactivation cylinder group side. The partition wall is provided in the upstream side intake passage. A blow-by gas returning pipe connects an internal space of the variable cylinder engine and the space on the activation cylinder group side to each other.

According to an embodiment of the present invention, the upstream side intake passage is an air cleaner having the single chamber. The partition wall partitions the chamber into the space on the activation cylinder group side and the space on the deactivation cylinder group is provided in the air cleaner. The blow-by gas returning pipe connects an internal space of the variable cylinder engine and a space on the activation cylinder group side to each other.

According to an embodiment of the present invention, the partition wall extends from a bottom portion of a clean chamber of the air cleaner toward an element. The blow-by gas returning pipe is connected to the space of the activation cylinder group side of the clean chamber.

According to an embodiment of the present invention, an inlet of the blow-by gas returning pipe is provided so as to be directed to the partition wall.

According to an embodiment of the present invention, the blow-by gas returning pipe is connected at the upstream end thereof to a front cylinder block of the activation cylinder group side.

According to an embodiment of the present invention, the air cleaner is disposed directly above the front cylinder block. The blow-by gas returning pipe is connected at the upstream end thereof to a cylinder head cover of the activation cylinder group side, and the blow-by gas returning pipe is connected at the downstream end thereof to the space on the activation cylinder group side of the air cleaner.

According to an embodiment of the present invention, the variable cylinder engine includes a secondary air supplying apparatus for introducing fresh air into exhaust passages. An air intake opening of the secondary air supplying apparatus is provided for the space on the deactivation cylinder group side of the air cleaner.

According to an embodiment of the present invention, the inlet of the blow-by gas returning pipe and the air intake opening of the secondary air supplying apparatus are provided on or in the proximity of the bottom portion of the air cleaner.

According to an embodiment of the present invention, the upstream side intake passage is provided on the upstream side of the throttle bodies with the single chamber. Further, the partition wall that partitions the chamber into the space on the activation cylinder group side and the space on the deactivation cylinder group side is provided in the upstream side intake passage. Furthermore, the blow-by gas pipe that connects the internal space of the variable cylinder engine and the space of the activation cylinder group side to each other is provided. Therefore, blow-by gas introduced into the upstream side intake passage is fed only into the activation cylinder group without being fed into the deactivation cylinder group. Consequently, blow-by gas can be purified with certainty.

According to an embodiment of the present invention, the upstream side intake passage is the air cleaner having the single chamber, and the partition wall that partitions the chamber into the space on the activation cylinder group side and the space on the deactivation cylinder group is provided in the air cleaner. Further, the blow-by gas returning pipe connects the internal space of the variable cylinder engine and the space on the activation cylinder group side to each other. Therefore, blow-by gas introduced into the air cleaner can be fed only into the activation cylinder group without being fed into the deactivation cylinder group to purify the blow-by gas with certainty. Further, since blow-by gas can be fed into the activation cylinder group by a simple and easy structure, a change with respect to the existing piping configuration can be minimized.

According to an embodiment of the present invention, the partition wall is formed such that it extends from the bottom portion of the clean chamber of the air cleaner toward the element, and the blow-by gas returning pipe is connected to the activation side space of the clean chamber. Therefore, the activation side space and the deactivation side space can be separated from each other only by partitioning the clean chamber by the partition wall. Consequently, change of the air cleaner can be minimized.

According to an embodiment of the present invention, since the inlet of the blow-by gas returning pipe is provided so as to be directed to the partition wall, blow-by gas can be prevented from being injected directly to the element. Consequently, since progress of the dirt to the element can be suppressed, the maintenance cycle of the element can be elongated.

According to an embodiment of the present invention, since the blow-by gas returning pipe is connected at the upstream end thereof to the front cylinder block of the activation cylinder group side, blow-by gas from the activation cylinder group can be emitted positively and rapidly. Consequently, the purification efficiency of blow-by gas can be raised.

According to an embodiment of the present invention, the air cleaner is disposed directly above the front cylinder block and the blow-by gas returning pipe is connected at the upstream end thereof to the cylinder head cover of the activation cylinder group side and at the downstream end thereof to the activation side space of the air cleaner. Therefore, the blow-by gas returning pipe can be made short.

According to an embodiment of the present invention, the variable cylinder engine includes the secondary air supplying apparatus for introducing fresh air into the exhaust passage, and the air intake opening of the secondary air supplying apparatus is provided for the space of the deactivation cylinder group side of the air cleaner. Therefore, blow-by gas can be prevented from flowing to the exhaust passage of the deactivation cylinder group side through the secondary air supplying apparatus.

According to an embodiment of the present invention, the inlet of the blow-by gas returning pipe and the air intake opening of the secondary air supplying apparatus are provided on or in the proximity of the bottom portion of the air cleaner. Therefore, blow-by gas can be prevented from flowing into the air intake opening of the secondary air supplying apparatus with a higher degree of certainty.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
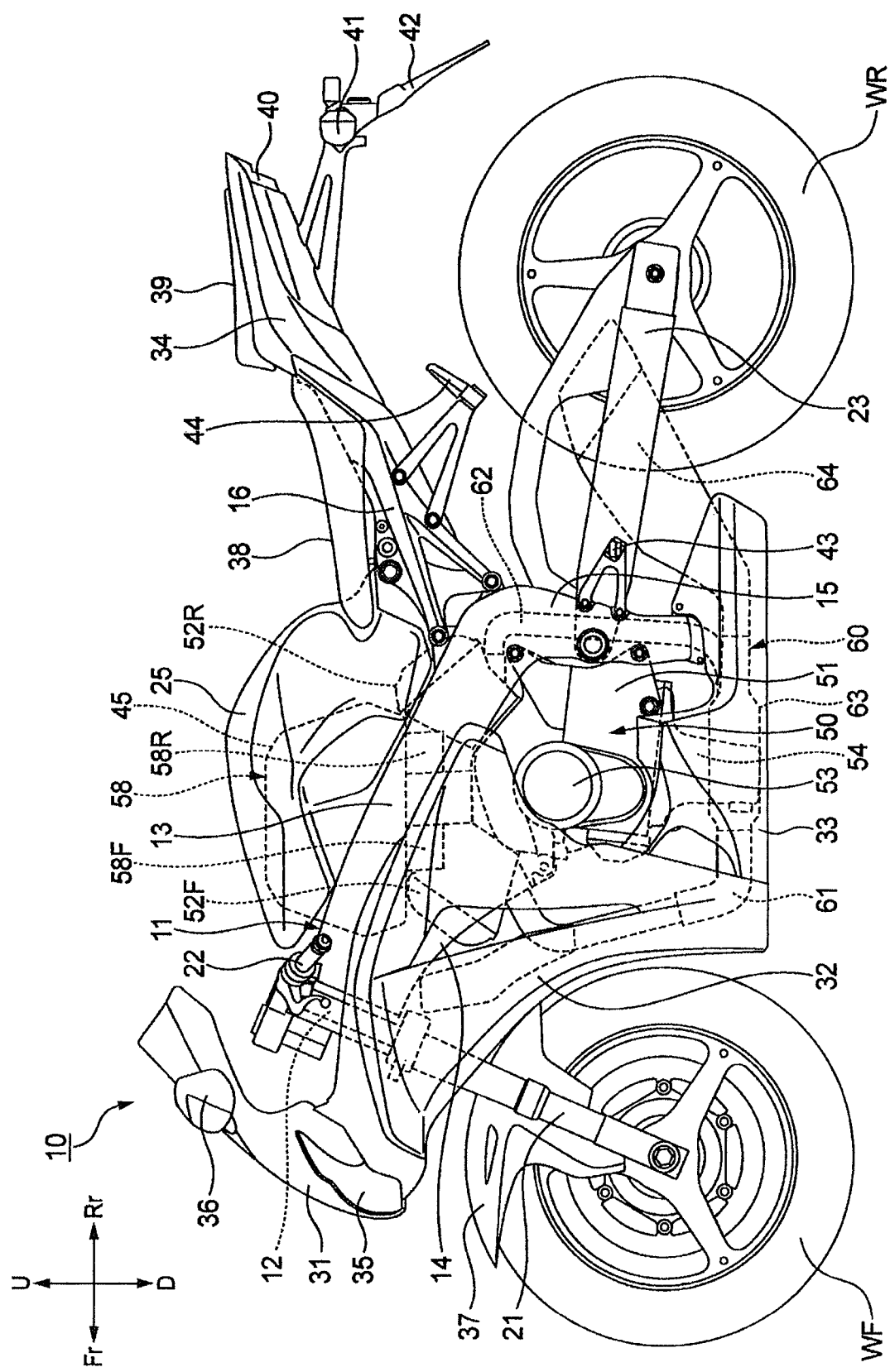
FIG. 1 is a left side elevational view depicting a motorcycle in which an exhaust system for a variable cylinder engine according to a first embodiment of the present invention is incorporated.

In the following, exhaust systems for a variable cylinder engine according to several embodiments of the present invention are described in detail with reference to the drawings. It is to be noted that the drawings should be viewed in the direction of reference characters, and in the following description, the forward, rearward, leftward, rightward, upward and downward directions are those as viewed from an operator. In addition, in the drawings, the front side of the vehicle is denoted by Fr, the rear side by Rr, the left side by L, the right side by R, the upper side by U and the lower side by D.

First, an exhaust system for a variable cylinder engine according to a first embodiment of the present invention is described with reference to FIGS. 1 to 7.

As shown in FIG. 1, a motorcycle 10 in the present embodiment includes a vehicle body frame 11 that is configured from a head pipe 12 provided at a front end thereof, and a pair of left and right main frames 13 extending rearwardly and downwardly from the head pipe 12. The vehicle body frame 11 is further configured from a pair of left and right engine hangers 14 extending downwardly from a lower face of a front portion of the paired left and right main frames 13. The vehicle body frame 11 is configured further from a pair of left and right pivot plates 15 connected to a rear end portion of the paired left and right main frames 13 and extending downwardly, and a pair of left and right seat frames 16 connected to an upper portion of the paired left and right pivot plates 15 and extending rearwardly and upwardly. An engine 50 is attached to the engine hangers 14 and the pivot plates 15.

The motorcycle 10 further includes a front fork 21 supported for steering movement on the head pipe 12, a front wheel WF supported for rotation at a lower end portion of the front fork 21, and a steering handlebar 22 attached to an upper end portion of the front fork 21. The motorcycle 10 further includes a swing arm 23 swingably supported on the pivot plates 15, a rear wheel WR supported for rotation at a rear end portion of the swing arm 23, and a fuel tank 25 disposed above the engine 50.

It is to be noted that in FIG. 1 a front cowl 31, a front side cowl 32, an under cowl 33, a rear cowl 34, a headlamp 35, a side mirror 36, a front fender 37, a rider's seat 38, a passenger's seat 39, a tail lamp 40, a rear directional indicator 41, a rear fender 42, a main step 43, and a pillion step 44 are provided.

Figure 2:
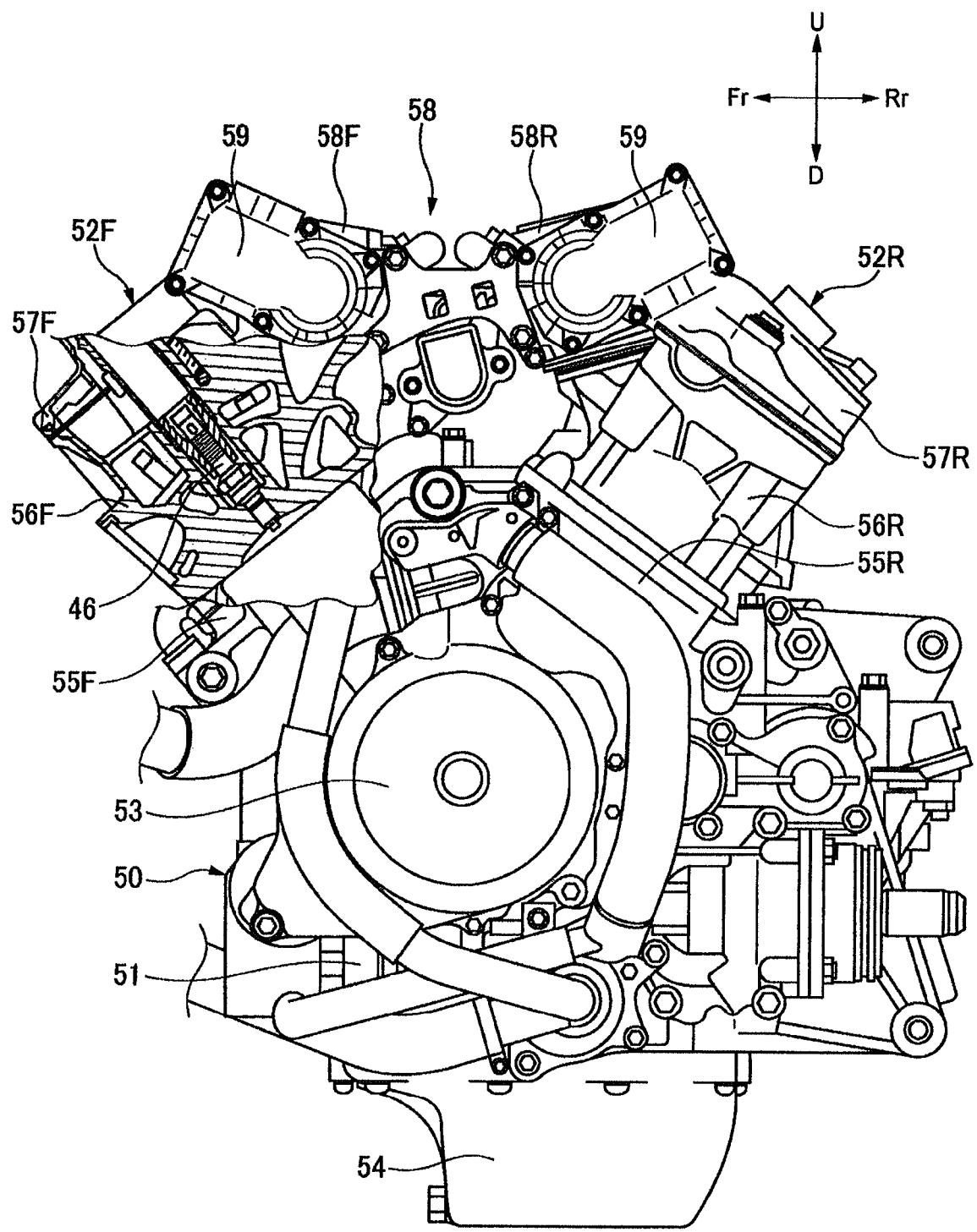
FIG. 2 is a left side elevational view of an engine shown in FIG. 1.

The engine 50 is a water-cooled V-shape four-cylinder variable cylinder engine that includes, as shown in FIGS. 1 and 2, a crankcase 51, and a front cylinder block 52F and a rear cylinder block 52R disposed in a V-shape on the front and the rear of an upper portion of the crankcase 51. The engine 50 further includes a generator cover 53 attached to a left side face of the crankcase 51, a clutch cover not shown attached to a right side face of the crankcase 51, and an oil pan 54 attached to a lower face of the crankcase 51. Further, in the present embodiment, an activation cylinder group (two cylinders) which is normally actuated is incorporated in the front cylinder block 52F. Meanwhile, a deactivation cylinder group (two cylinders) wherein fuel supply is stopped under a particular condition is incorporated in the rear cylinder block 52R.

Further, as shown in FIG. 2, the front cylinder block 52F includes cylinders 55F formed integrally at a front upper portion of the crankcase 51, a cylinder head 56F attached to an upper end portion of the cylinders 55F, and a cylinder head cover 57F attached to an upper end portion of the cylinder head 56F. The rear cylinder block 52R includes cylinders 55R formed integrally at a rear upper portion of the crankcase 51, a cylinder head 56R attached to an upper end portion of the cylinders 55R, and a cylinder head cover 57R attached to an upper end portion of the cylinder head 56R.

An intake system 58 is connected to a rear face of the cylinder head 56F of the front cylinder block 52F and a front face of the cylinder head 56R of the rear cylinder block 52R. Further, an exhaust system 60 of the present embodiment is connected to a front face of the cylinder head 56F of the front cylinder block 52F and a rear face of the cylinder head 56R of the rear cylinder block 52R.

As shown in FIGS. 1 and 2, the intake system 58 includes a activation side throttle body 58F connected to the cylinder head 56F of the front cylinder block 52F of the activation cylinder group, and a deactivation side throttle body 58R connected to the cylinder head 56R of the rear cylinder block 52R of the deactivation cylinder group. The intake system 58 further includes an air cleaner 45 connected to an upstream end of the activation side throttle body 58F and the deactivation side throttle body 58R.

Figure 3:
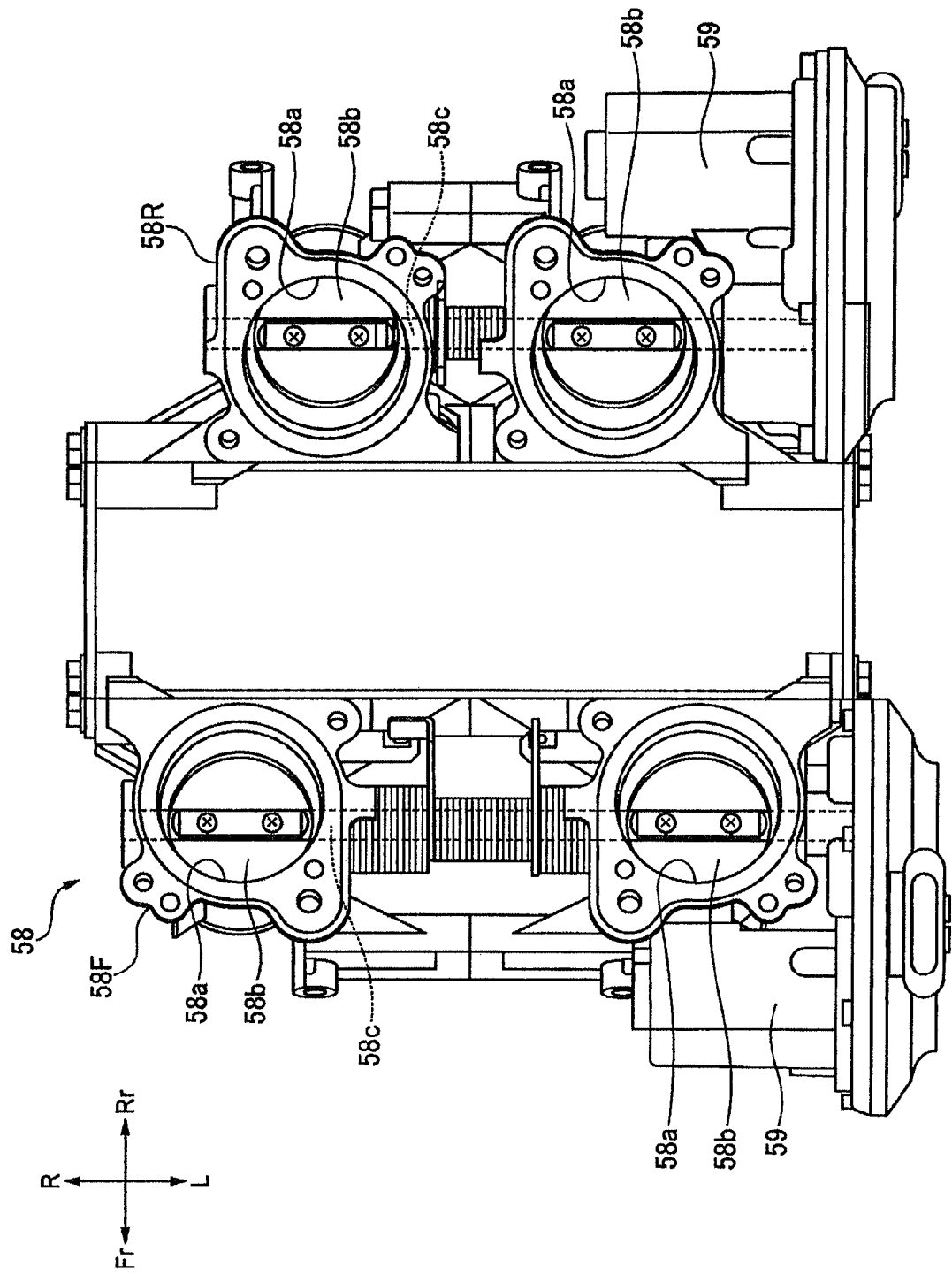
FIG. 3 is a top plan view of a throttle body shown in FIG. 2.

As shown in FIG. 3, the activation side throttle body 58F includes two intake passages 58a communicating with the cylinders of the activation cylinder group of the front cylinder block 52F, two throttle valves 58b for opening and closing the intake passages 58a, a single valve shaft 58c having the two throttle valves 58b attached thereto, and a driving motor 59 for driving the valve shaft 58c.

As shown in FIG. 3, the deactivation side throttle body 58R includes two intake passages 58a communicating with the cylinders of the deactivation cylinder group of the rear cylinder block 52R, two throttle valves 58b for opening and closing the two intake passages 58a, a single valve shaft 58c having the two throttle valves 58b attached thereto, and a driving motor 59 for driving the valve shaft 58c.

Since the throttle valves 58b of the activation side and deactivation side throttle bodies 58F and 58R are controlled independently of each other by the driving motors 59 in this manner, also it is possible to make opening characteristics of the throttle valves 58b of the front and rear cylinder blocks 52F and 52R coincide with each other or to conversely make the opening characteristics independent of each other. It is to be noted that, while, in the present embodiment, the driving motor 59 is provided for each of the activation side and deactivation side throttle bodies 58F and 58R, the provision of the driving motor 59 is not limited to this. In particular, the driving motor 59 may be provided for one of the activation side and deactivation side throttle bodies 58F and 58R while a conventional manual driving mechanism is used for the other one of the activation side and deactivation side throttle bodies 58F and 58R to control the throttle openings of the front and rear cylinder blocks 52F and 52R so as to coincide with each other or be independent of each other.

In control of the engine 50 in the present embodiment, when the engine 50 operates in all-cylinder operation wherein all of the four cylinders are activated, the driving motors 59 are controlled so that the throttle valve 58b of the activation side and deactivation side throttle bodies 58F and 58R of the front and rear cylinder blocks 52F and 52R are opened and closed in synchronism with each other. Consequently, for example, fuel supply by fuel supply apparatus (not shown) such as injectors and ignition by ignition plugs 46 (refer to FIG. 2) are carried out in a normal manner.

Figure 4:
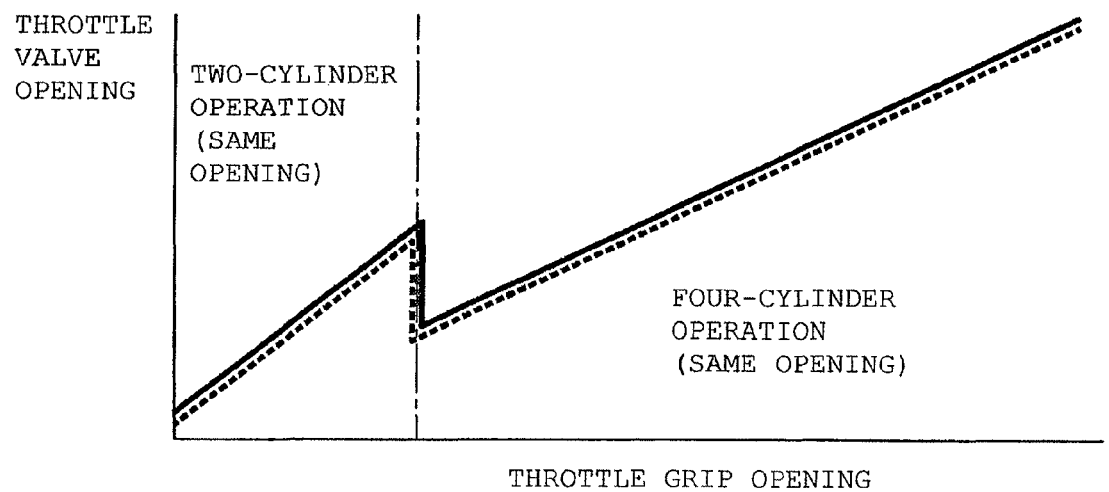
FIG. 4 is a graph illustrating a relationship between the opening of a throttle grip and the opening of a throttle valve.

On the other hand, in partial-cylinder operation wherein the two cylinders of the activation cylinder group of the front cylinder block 52F are activated and the two cylinders of the deactivation cylinder group of the rear cylinder block 52R are deactivated, the following control is carried out. In particular, in the front cylinder block 52F, opening and closing control of the throttle valves 58b and fuel supply by the fuel supply apparatus (not shown) such as, for example, injectors and ignition by the ignition plugs 46 are carried out as described above. In the rear cylinder block 52R, although fuel supply and ignition by the ignition plugs 46 are stopped, the throttle valves 58b are controlled to open and close in synchronism with the throttle valves 58b of the front cylinder block 52F as seen in FIG. 4 in order to reduce engine driving loss by pumping. Accordingly, upon partial cylinder operation, air passing the rear cylinder block 52R is discharged to the exhaust system 60 without being used for combustion.

Figure 5:
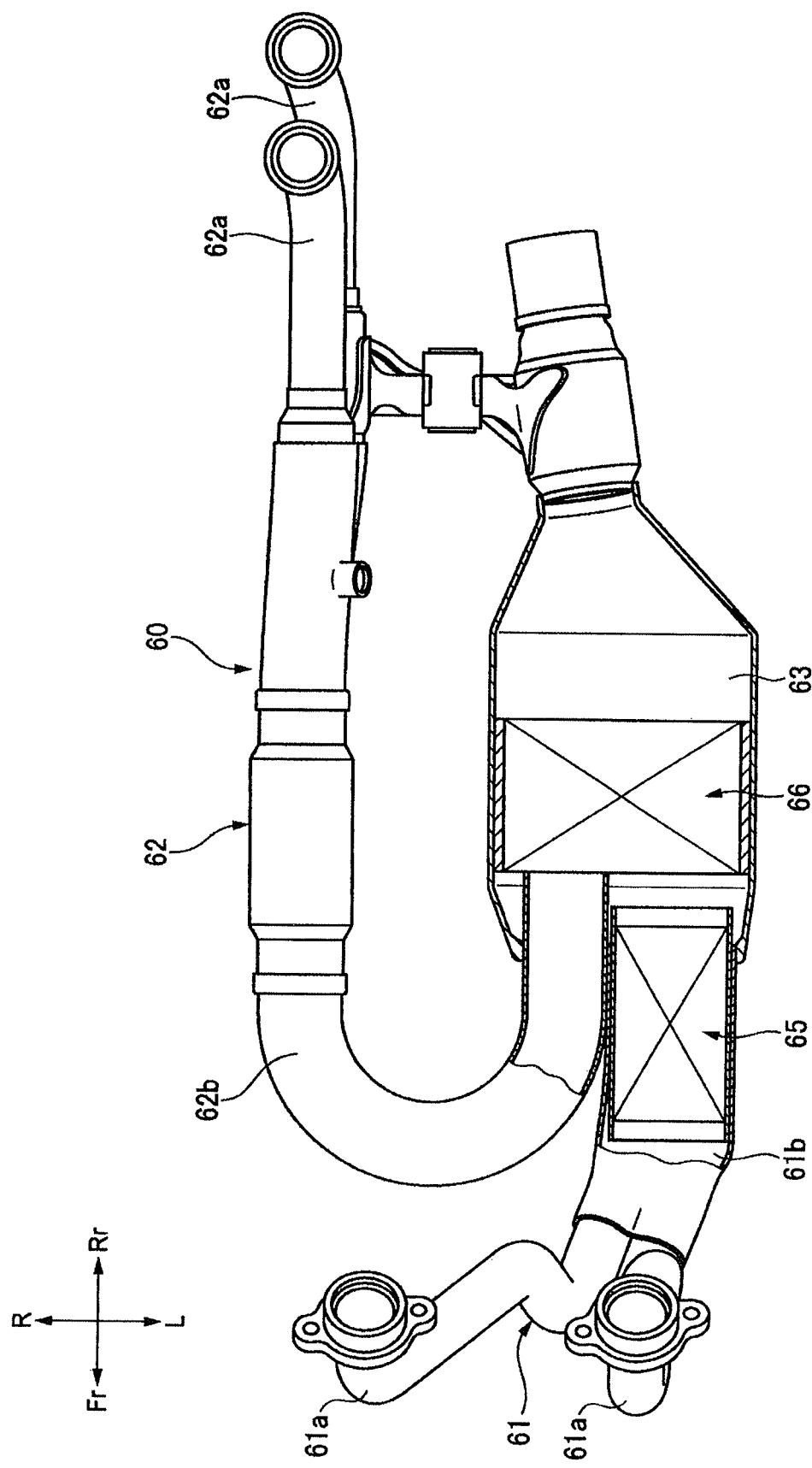
FIG. 5 is a top plan view partly in section of an exhaust system shown in FIG. 1.

As shown in FIGS. 1 and 5, the exhaust system 60 includes an activation side exhaust pipe 61 connected to the activation cylinder group of the front cylinder block 52F and a deactivation side exhaust pipe 62 connected to the deactivation cylinder group of the rear cylinder block 52R. The exhaust system further includes a gathering section 63 connected to a downstream end of the activation side exhaust pipe 61 and the deactivation side exhaust pipe 62. The exhaust system 60 further includes a muffler 64 connected to a downstream end of the gathering section 63, a sub-catalyst 65 disposed in the activation side exhaust pipe 61, and a main catalyst 66 disposed at the gathering section 63. The gathering section 63 is disposed below the crankcase 51 of the engine 50.

The activation side exhaust pipe 61 includes two upstream side exhaust pipes 61a connected to the activation cylinders of the front cylinder block 52F, and an activation side gathering section 61b connected to the downstream end of the two upstream side exhaust pipes 61a and configured as a separate member from the two upstream side exhaust pipes 61a. The sub-catalyst 65 is disposed at the activation side gathering section 61b.

The deactivation side exhaust pipe 62 includes two upstream side exhaust pipes 62a connected to the deactivation cylinders of the rear cylinder block 52R, and a deactivation side gathering section 62b connected to a downstream end of the two upstream side exhaust pipes 62a and configured as a separate member from the two upstream side exhaust pipes 62a.

As shown in FIG. 5, the sub-catalyst 65 includes a catalyst main body 65a formed so as to partition gas, which flows in the inside thereof, in two flows independent of each other in the flow path direction, and an external cylinder member 65b covering an outer peripheral face of the catalyst main body 65a and configuring a shell. The sub-catalyst 65 is formed so as to have a circular cross section.

Figure 6:
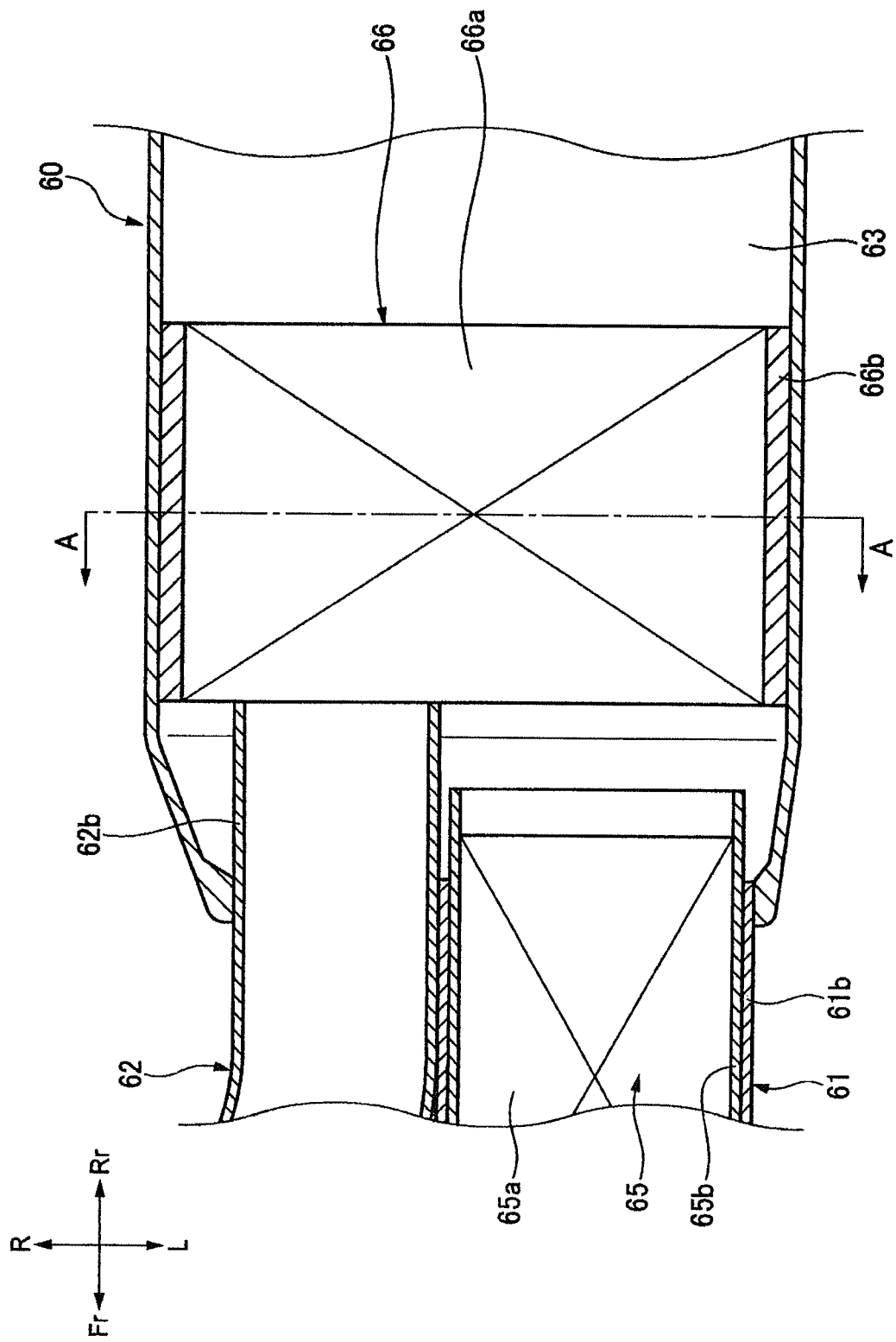
FIG. 6 is an enlarged top plan view partly in section depicting peripheral elements of a main catalyst and a sub-catalyst shown in FIG. 5.
Figure 7:
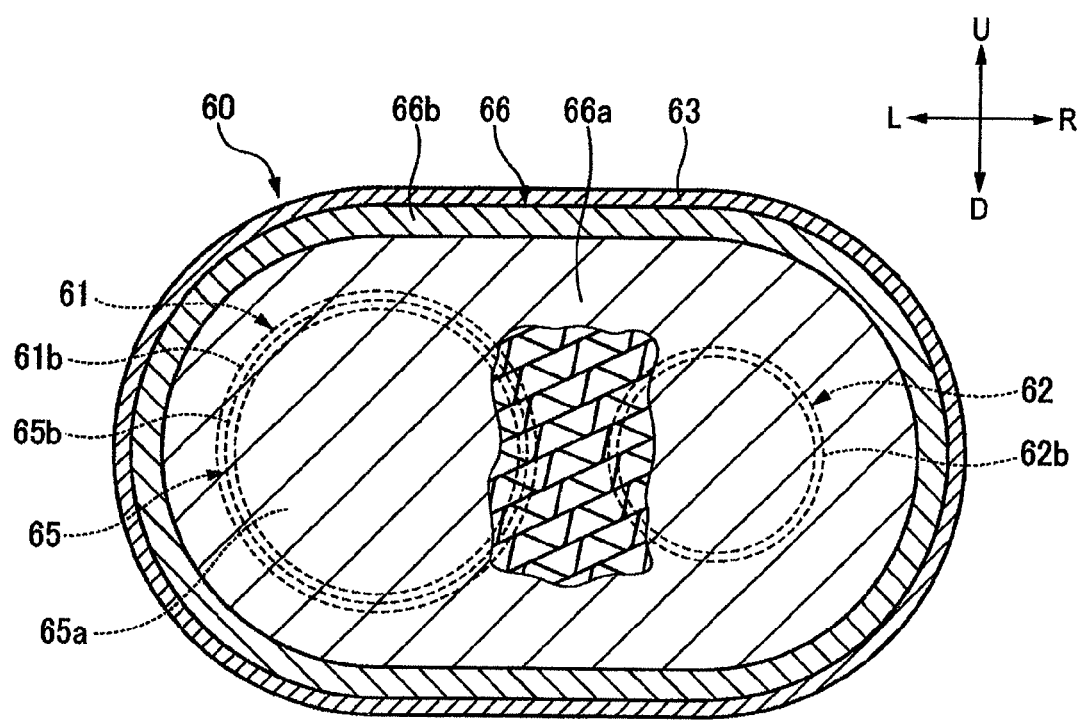
FIG. 7 is a sectional view taken along line A-A of FIG. 6.

As shown in FIGS. 6 and 7, the main catalyst 66 includes a catalyst main body 66a which innumerably gathers throughpaths partitioned by a honeycomb structure (only part of which is shown in FIG. 7) in a broad sense over an overall area thereof such that gas passing through the inside thereof is partitioned independently of each other in the flow path direction. The main catalyst 66 further includes an external cylinder member 66b which covers an outer peripheral face of the catalyst main body 66a and configuring a shell. The main catalyst 66 is formed so as to have a cross section of a flattened shape (elliptical cross sectional shape) such that it spans in an array direction (vehicle widthwise direction) of lower ends of the activation side exhaust pipe 61 and the deactivation side exhaust pipe 62. Accordingly, also the gathering section 63 is formed in a flattened cross sectional shape (elliptical cross sectional shape) conforming to the main catalyst 66.

Further, in the present embodiment, the downstream end of the deactivation side gathering section 62b of the deactivation side exhaust pipe 62 extends to the main catalyst 66 side while the downstream end of the deactivation side gathering section 62b is abutted with the upstream end of the main catalyst 66. Therefore, exhaust gas of the deactivation side exhaust pipe 62 passes the location of the main catalyst 66 at which the downstream end of the deactivation side gathering section 62b abuts while exhaust gas of the activation side exhaust pipe 61 passes a location of the main catalyst 66 at which the downstream end of the deactivation side gathering section 62b does not abut. Accordingly, it is considered that the activation side exhaust pipe 61 and the deactivation side exhaust pipe 62 are connected in a mutually independent state to the main catalyst 66.

It is to be noted that, while, in the present embodiment, the downstream end of the deactivation side gathering section 62b of the deactivation side exhaust pipe 62 is abutted with the upstream end of the main catalyst 66, the connection of them is not limited to this. In particular, the downstream end of the activation side gathering section 61b of the activation side exhaust pipe 61, or the downstream ends of both of the activation side gathering section 61b and the deactivation side gathering section 62b may be abutted with the upstream end of the main catalyst 66.

As described above, according to the exhaust system 60 of the present embodiment, the main catalyst 66 is formed such that gas passing the inside thereof is partitioned independently of each other in the flow path direction, and the activation side exhaust pipe 61 and the deactivation side exhaust pipe 62 are connected in a mutually independent state to the main catalyst 66. Therefore, exhaust gas of the activation cylinder group passing through the sub-catalyst 65 and fresh air flowing from the deactivation cylinder group are not mixed on the upstream side of the main catalyst 66. Therefore, exhaust gas of the activation cylinder group passing through the sub-catalyst 65 can be purified by the main catalyst 66, and consequently, production of NO at the gathering section 63 can be suppressed. Accordingly, an exhaust gas purification performance of the exhaust system 60 can be assured without increasing the number of catalysts.

Further, according to the exhaust system 60 in the present embodiment, the main catalyst 66 is formed in a flattened cross sectional shape such that it spans in the array direction of the downstream ends of the activation side exhaust pipe 61 and the deactivation side exhaust pipe 62. Therefore, the whole quantity of exhaust gas from the activation side exhaust pipe 61 and the deactivation side exhaust pipe 62 can be introduced into the main catalyst 66. Consequently, the exhaust gas purification performance of the exhaust system 60 can be assured by increasing the capacity of the main catalyst 66.

Further, with the exhaust system 60 of the present embodiment, since the downstream end of the deactivation side exhaust pipe 62 abuts with the upstream end of the main catalyst 66, exhaust gas can be partitioned making use of the deactivation side exhaust pipe 62.

Further, with the exhaust system 60 in the present embodiment, since the sub-catalyst 65 is disposed at the activation side gathering section 61b of the two upstream side exhaust pipes 61a, there is no necessity to provide a sub-catalyst in conformity with the number of cylinders. Consequently, increase of the number of sub-catalysts can be suppressed.

Further, with the exhaust system 60 of the present embodiment, since the activation side gathering section 61b is configured as a separate member from the two upstream side exhaust pipes 61a, when the sub-catalyst 65 is additionally provided, design of the arrangement position and the dimension can be carried out readily.

Further, with the exhaust system 60 in the present embodiment, since the gathering section 63 is disposed below the crankcase 51 of the engine 50, by using the main catalyst 66 of a flattened cross sectional shape, the heightwise dimension of the gathering section 63 can be suppressed to assure a minimum ground height of the motorcycle 10. Further, since the activation cylinder group is incorporated in the front cylinder block 52F, the number of curved portions of the activation side exhaust pipes 61 is smaller than that of the deactivation side exhaust pipe 62 connected to the rear cylinder block 52R, and arrangement of the sub-catalyst 65 in the activation side exhaust pipe 61 can be carried out readily.

Figure 8:
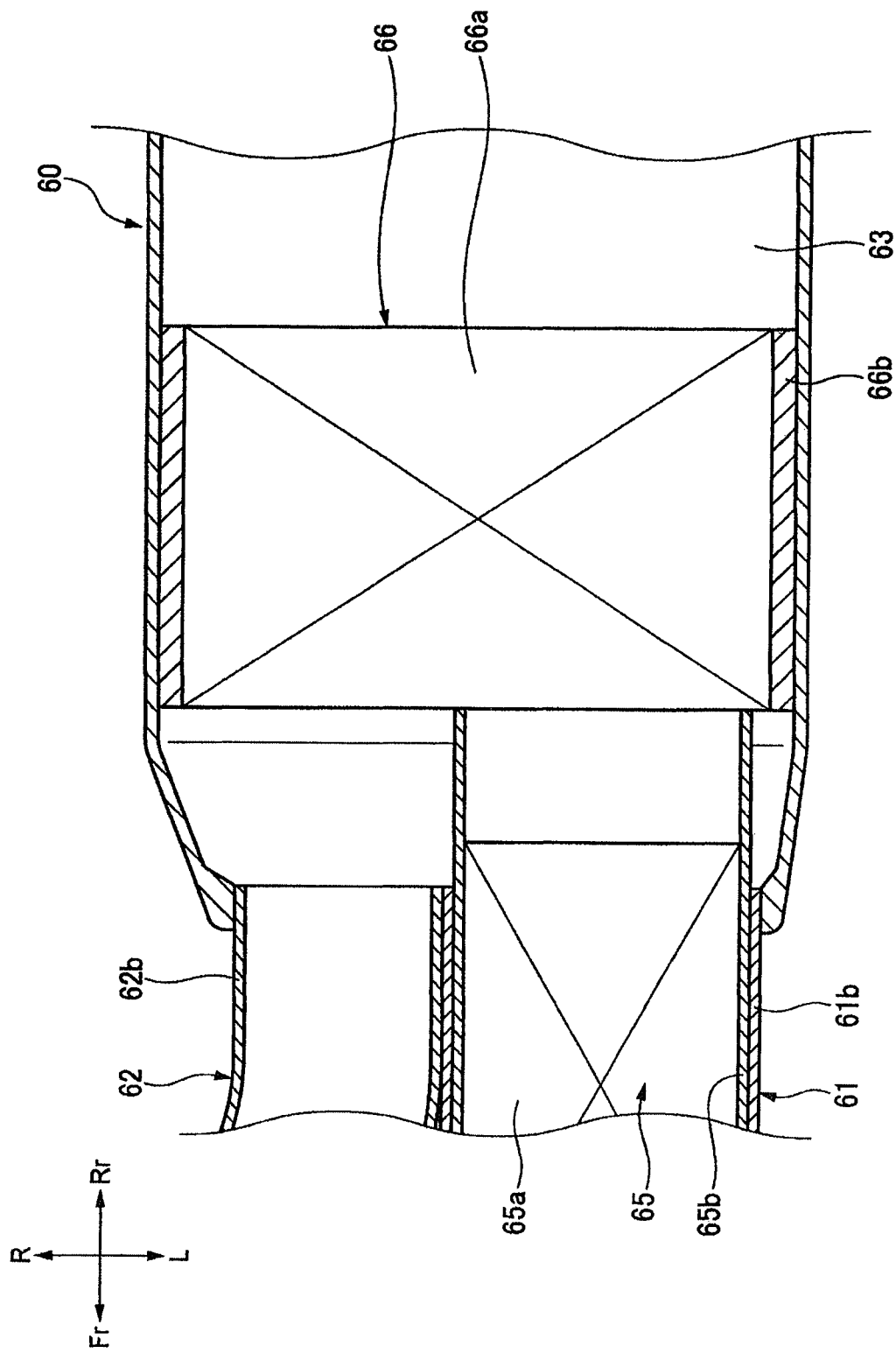
FIG. 8 is a top plan view corresponding to FIG. 6 depicting an exhaust system for a variable cylinder engine according to a second embodiment of the present invention.

Now, an exhaust system for a variable cylinder engine according to a second embodiment of the present invention is described with reference to FIG. 8. It is to be noted that like or equivalent portions to those of the first embodiment are denoted by like reference characters in the figures and a description of the portions is omitted or simplified.

In the present embodiment, in place of the downstream end of the deactivation side gathering section 62b of the deactivation side exhaust pipe 62, the downstream end of the external cylinder member 65b of the sub-catalyst 65 extends to the main catalyst 66 side, and the downstream end of the external cylinder member 65b abuts with the upstream end of the main catalyst 66. Therefore, exhaust gas of the activation side exhaust pipe 61 passes the location of the main catalyst 66 at which the downstream end of the external cylinder member 65b abuts while exhaust gas of the deactivation side exhaust pipe 62 passes the location of the main catalyst 66 at which the downstream end of the external cylinder member 65b does not abut. Accordingly, the activation side exhaust pipe 61 and the deactivation side exhaust pipe 62 are connected in a mutually independent state to the main catalyst 66.

As described above, according to the exhaust system 60 in the present embodiment, since the downstream end of the external cylinder member 65b of the sub-catalyst 65 abuts with the upstream end of the main catalyst 66, exhaust gas of the activation side exhaust pipe 61 and exhaust gas of the deactivation side exhaust pipe 62 can be partitioned making use of the sub-catalyst 65 irrespective of the shape of the exhaust pipes. Further, the number of parts can be reduced.

The configuration of the other part and the working effects are similar to those of the first embodiment described hereinabove.

Figure 9:
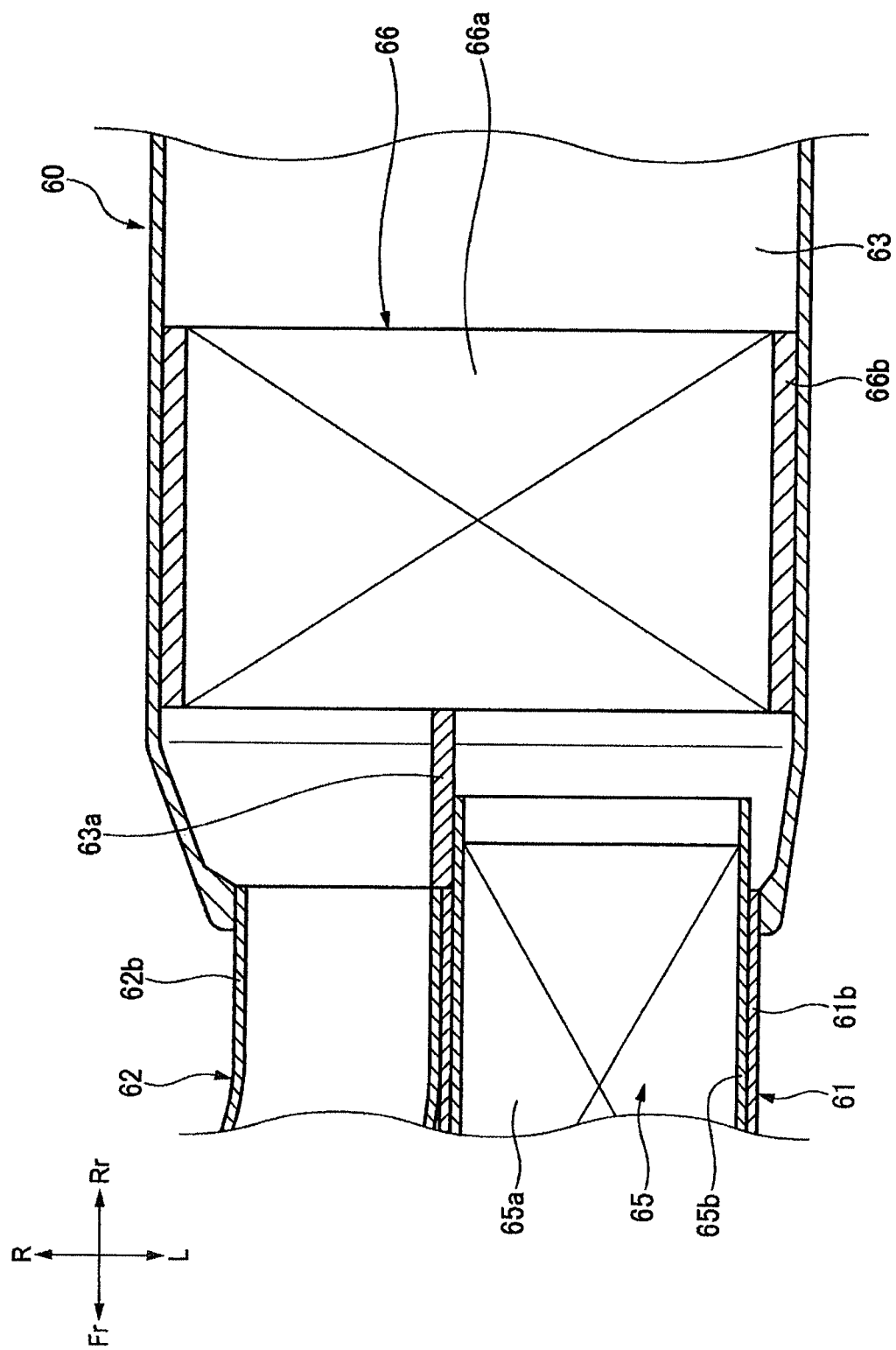
FIG. 9 is a top plan view corresponding to FIG. 6 but depicting an exhaust system for a variable cylinder engine according to a third embodiment of the present invention.

Now, an exhaust system for a variable cylinder engine according to a third embodiment of the present invention is described with reference to FIG. 9. It is to be noted that like or equivalent portions to those of the first embodiment are denoted by like reference characters in the figure and description of them is omitted or simplified.

In the present embodiment, a partition wall 63a that partitions a portion to which the activation side exhaust pipe 61 is connected and another portion to which the deactivation side exhaust pipe 62 is connected from each other to the left and the right is formed in the inside of the gathering section 63. The downstream end of the partition wall 63a is abutted with the upstream end of the main catalyst 66. Therefore, exhaust gas of the activation side exhaust pipe 61 passes the location of the main catalyst 66 on the activation side exhaust pipe 61 side with respect to the partition wall 63a while exhaust gas of the deactivation side exhaust pipe 62 passes the location of the main catalyst 66 on the deactivation side exhaust pipe 62 side with respect to the partition wall 63a. Accordingly, the activation side exhaust pipe 61 and the deactivation side exhaust pipe 62 are connected in a mutually independent state to the main catalyst 66.

As described above, according to the exhaust system 60 of the present embodiment, the partition wall 63a that partitions the portion to which the activation side exhaust pipe 61 is connected and the portion to which the deactivation side exhaust pipe 62 is connected from each other is provided at the gathering section 63, and the downstream end of the partition wall 63a is abutted with the upstream end of the main catalyst 66. Therefore, exhaust gas of the activation side exhaust pipe 61 and exhaust gas of the deactivation side exhaust pipe 62 can be partitioned by the partition wall 63a without changing the shape of conventional exhaust pipes.

The configuration of the other part and the working effects are similar to those of the first embodiment described hereinabove.

Figure 10:
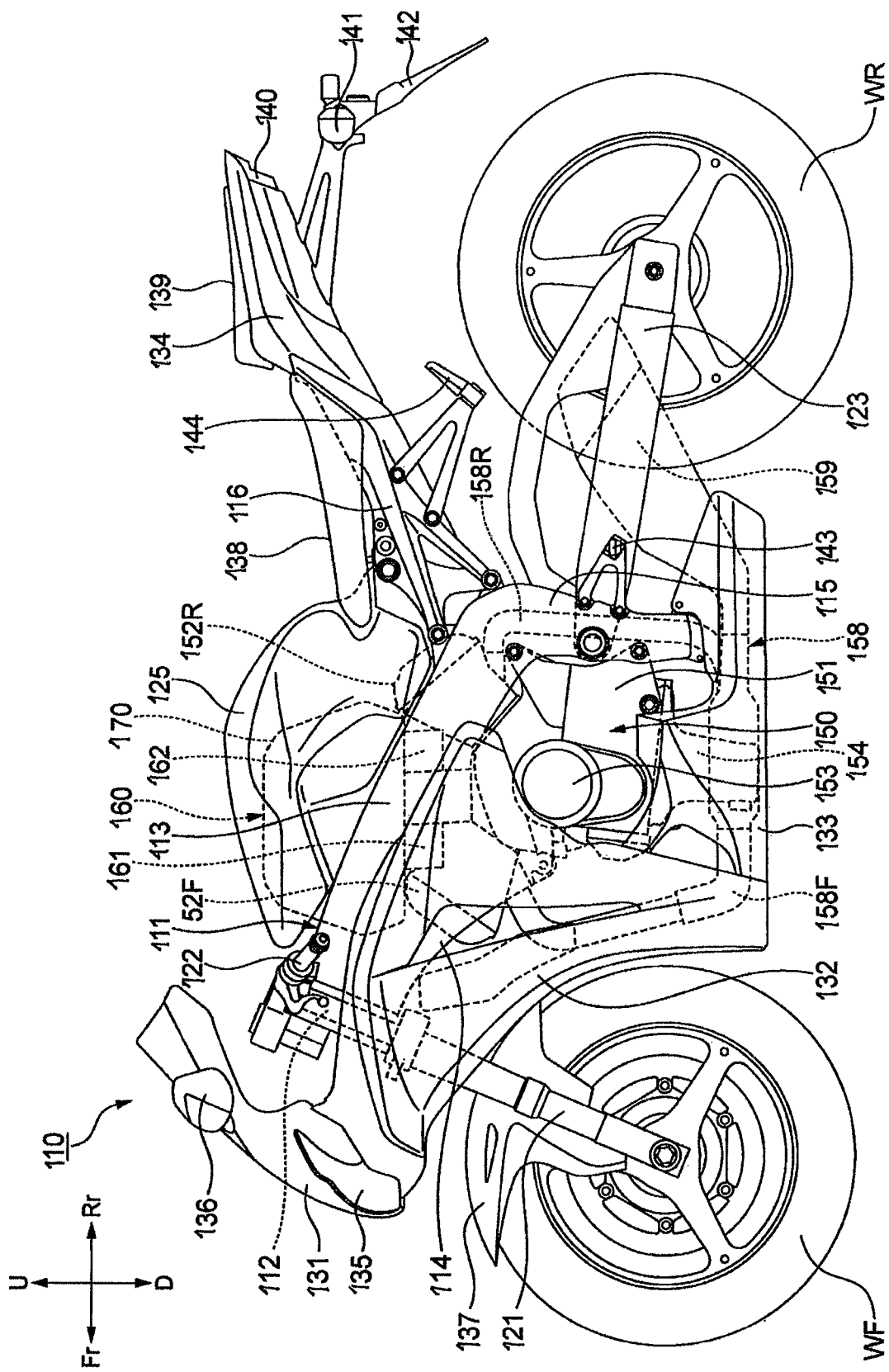
FIG. 10 is a left side elevational view depicting a motorcycle in which an intake system for a variable cylinder engine according to a first embodiment of the present invention is incorporated.

As shown in FIG. 10, a motorcycle 110 in the present embodiment includes a vehicle body frame 111 that is configured from a head pipe 112 provided at a front end thereof, and a pair of left and right main frames 113 extending rearwardly and downwardly from the head pipe 112. The vehicle body frame 111 is further configured from a pair of left and right engine hangers 114 extending downwardly from a lower face of a front portion of the paired left and right main frames 113. The vehicle body frame 111 is configured further from a pair of left and right pivot plates 115 connected to a rear end portion of the paired left and right main frames 113 and extending downwardly, and a pair of left and right seat frames 116 connected to an upper portion of the paired left and right pivot plates 115 and extending rearwardly and upwardly. An engine 150 is attached to the engine hangers 114 and the pivot plates 115.

The motorcycle 110 further includes a front fork 121 supported for steering movement on the head pipe 112, a front wheel WF supported for rotation at a lower end portion of the front fork 121, and a steering handlebar 122 attached to an upper end portion of the front fork 121. The motorcycle 110 further includes a swing arm 123 swingably supported on the pivot plates 115, a rear wheel WR supported for rotation at a rear end portion of the swing arm 123, and a fuel tank 125 disposed above the engine 150.

It is to be noted that in FIG. a front cowl 131 is provided together with a front side cowl 132, an under cowl 133, a rear cowl 134, a headlamp 135, a side mirror 136, a front fender 137, a rider's seat 138, a passenger's seat 139, a tail lamp 140, a rear directional indicator 141, a rear fender 142, a main step 143, and a pillion step 144.

Figure 11:
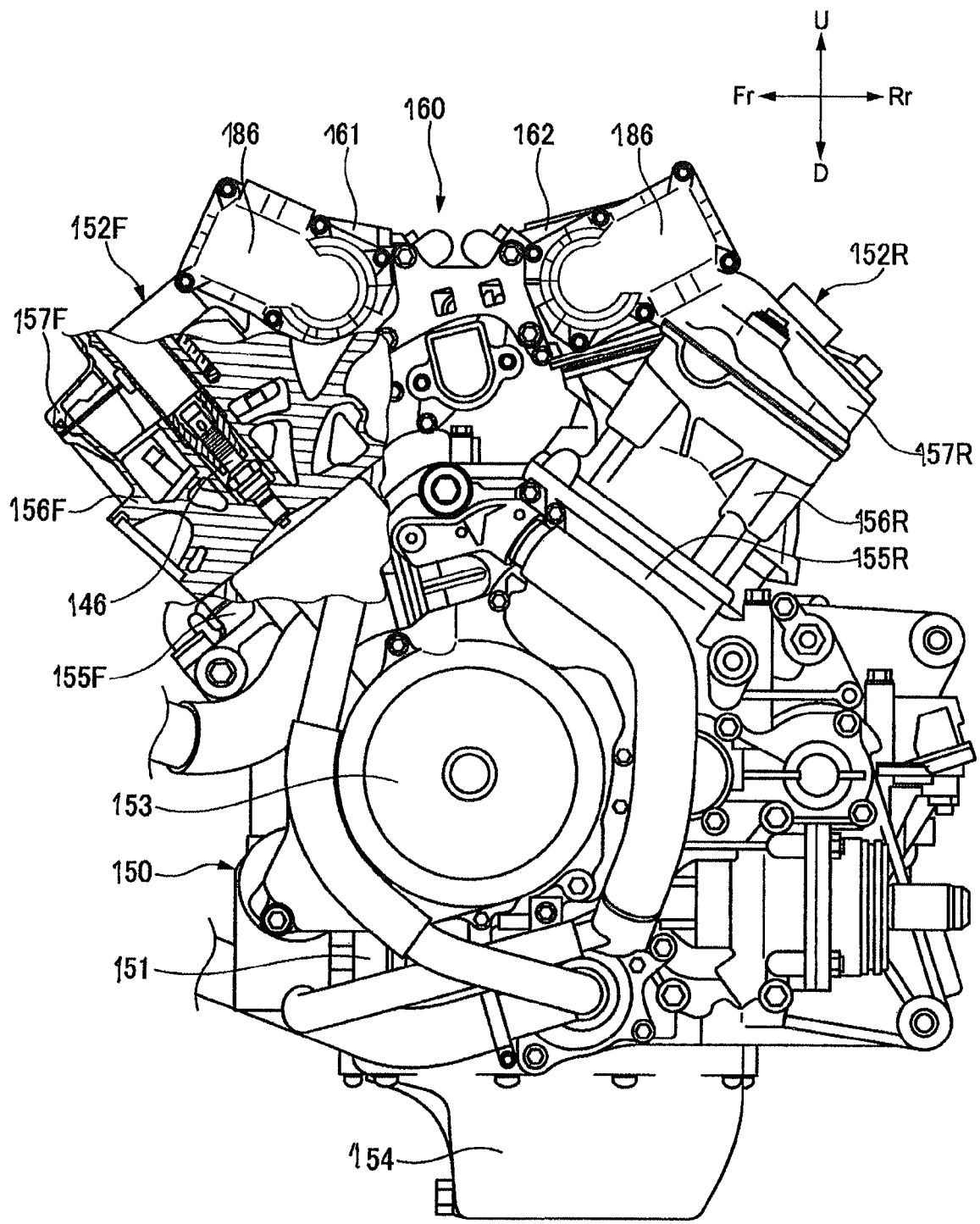
FIG. 11 is a left side elevational view of an engine shown in FIG. 10.

The engine 150 is a water-cooled V-shape four-cylinder variable cylinder engine and includes, as shown in FIGS. 10 and 11, a crankcase 151, and a front cylinder block 152F and a rear cylinder block 152R disposed in a V-shape on the front and the rear of an upper portion of the crankcase 151. The engine 150 further includes a generator cover 153 attached to a left side face of the crankcase 151, a clutch cover not shown attached to a right side face of the crankcase 151, and an oil pan 154 attached to a lower face of the crankcase 151. Further, in the present embodiment, an activation cylinder group (two cylinders) C1 that is normally actuated is incorporated in the front cylinder block 152F. Meanwhile, a deactivation cylinder group (two cylinders) C2 wherein fuel supply is stopped under a particular condition is incorporated in the rear cylinder block 152R.

Figure 13:
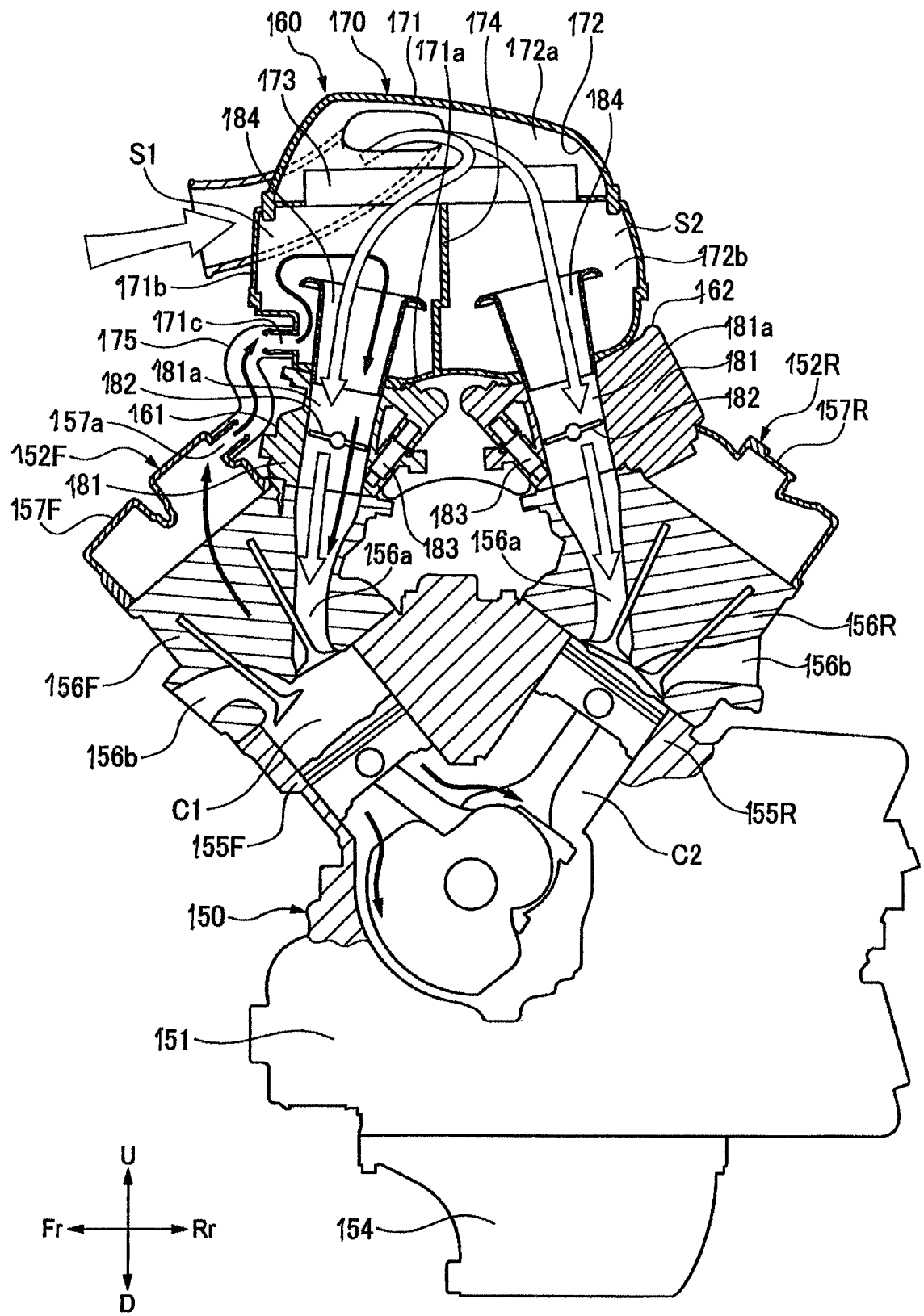
FIG. 13 is a left side elevational view depicting the engine and the intake system shown in FIG. 11.
Figure 14:
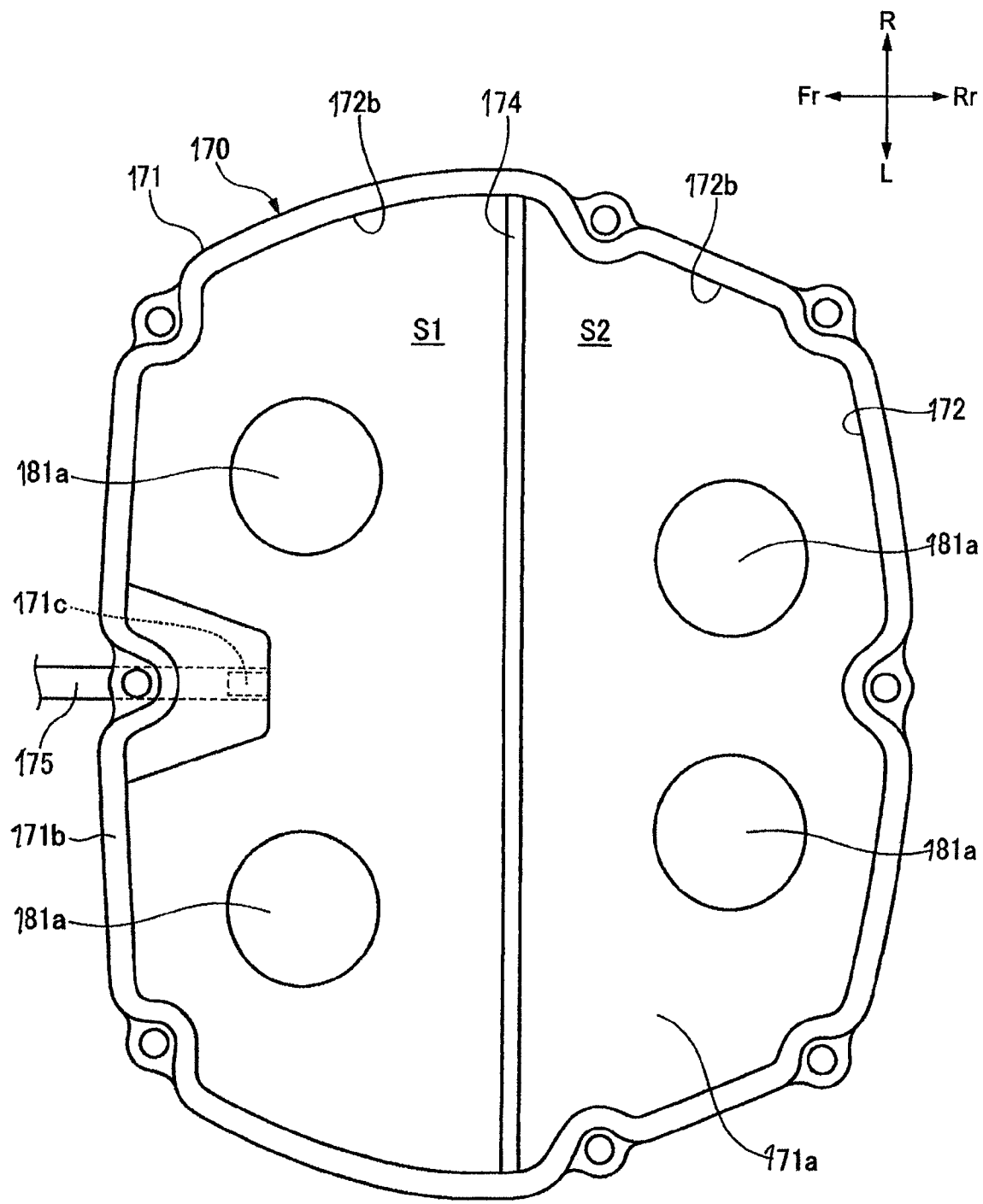
FIG. 14 is a top plan view of an air cleaner case shown in FIG. 13.

Further, as shown in FIGS. 11 and 13, the front cylinder block 152F includes cylinders 155F formed integrally at a front upper portion of the crankcase 151, a cylinder head 156F attached to an upper end portion of the cylinders 155F, and a cylinder head cover 157F attached to an upper end portion of the cylinder head 156F. The rear cylinder block 152R includes cylinders 155R formed integrally at a rear upper portion of the crankcase 151, a cylinder head 156R attached to an upper end portion of the cylinders 155R, and a cylinder head cover 157R attached to an upper end portion of the cylinder head 156R.

An intake system 160 of the present invention is connected to a rear face of the cylinder head 156F of the front cylinder block 152F and a front face of the cylinder head 156R of the rear cylinder block 152R. Further, an exhaust system 158 is connected to a front face of the cylinder head 156F of the front cylinder block 152F and a rear face of the cylinder head 156R of the rear cylinder block 152R.

The exhaust system 158 includes an activation side exhaust pipe 158F connected to an exhaust port 158b which is an exhaust passage of the cylinder head 156F of the front cylinder block 152F. The exhaust system 158 further includes a deactivation side exhaust pipe 158R connected to another exhaust port 156b which is an exhaust passage of the cylinder head 156R of the rear cylinder block 152R. The exhaust system 158 further includes a muffler 159 connected to the downstream ends of the activation side exhaust pipe 158F and the deactivation side exhaust pipe 158R.

As shown in FIG. 13, the intake system 160 includes an activation side throttle body 161 connected to a activation cylinder group C1 of the front cylinder block 152F, and a deactivation side throttle body 162 connected to a deactivation cylinder group C2 of the rear cylinder block 152R. The intake system 160 further includes an air cleaner (upstream side intake passage) 170 connected to the upstream ends of the activation side throttle body 161 and the deactivation side throttle body 162. The air cleaner 170 is disposed directly above the front cylinder block 152F and the rear cylinder block 152R.

The activation side throttle body 161 includes a throttle body main body 181 connected to an intake port 156a of the cylinder head 156F of the front cylinder block 152F and having an intake passage 181a, and a throttle valve 182 for opening and closing the intake passage 181a. The activation side throttle body 161 further includes an injector 183 for injecting fuel into the intake passage 181a, and an air funnel 184 attached to the upstream end of the throttle body main body 181.

The deactivation side throttle body 162 includes a throttle body main body 181 connected to an intake port 156a of the cylinder head 156R of the rear cylinder block 152R and having an intake passage 181a, and a throttle valve 182 for opening and closing the intake passage 181a. The deactivation side throttle body 162 further includes an injector 183 for injecting fuel into the intake passage 181a, and an air funnel 184 attached to the upstream end of the throttle body main body 181.

Figure 12:
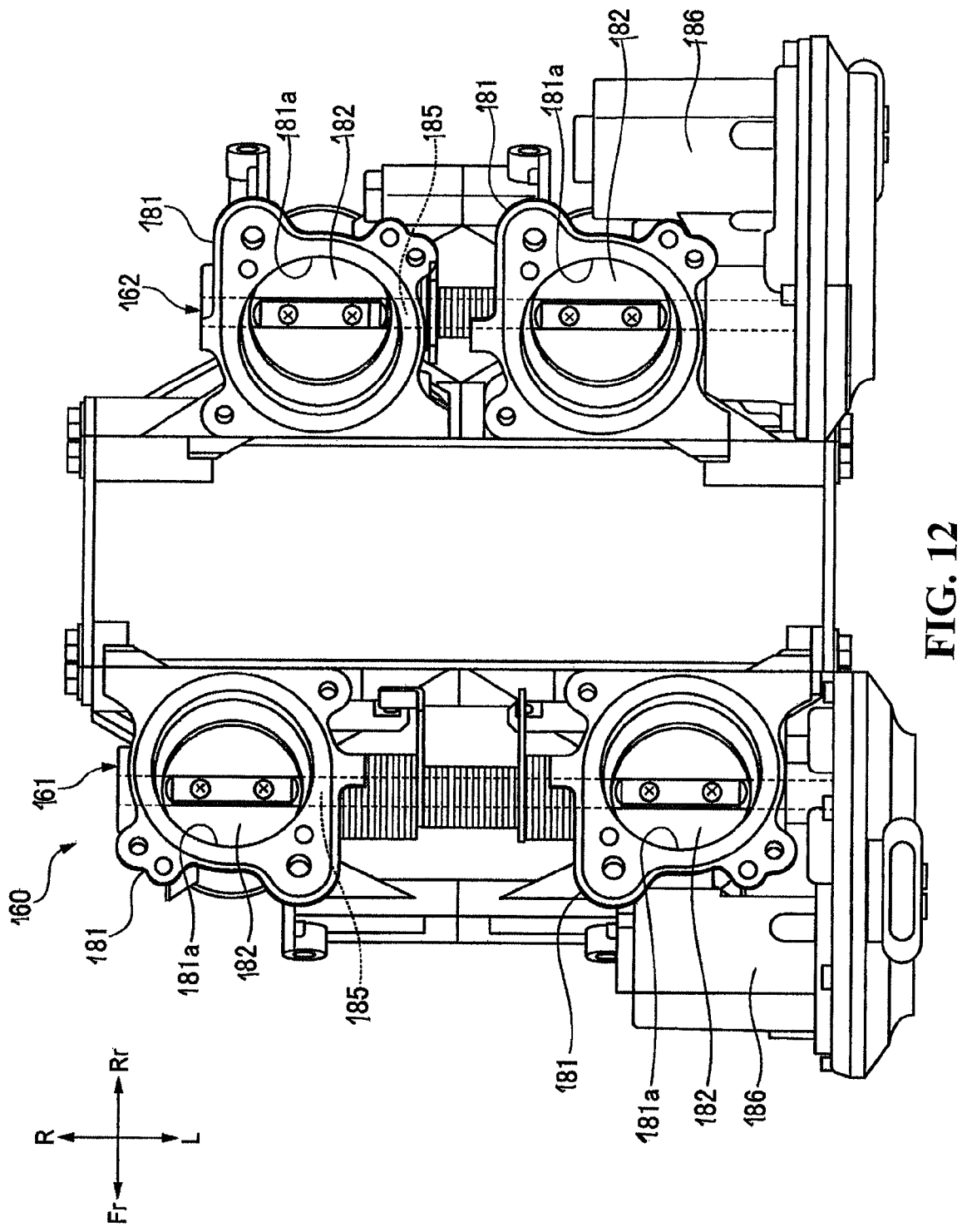
FIG. 12 is a top plan view of a throttle body shown in FIG. 11.

Further, as shown in FIG. 12, the two throttle valves 182 of the activation side throttle body 161 are attached to a single valve shaft 185, which is driven by a driving motor 186. Meanwhile, the two throttle valves 182 of the deactivation side throttle body 162 are attached to a single valve shaft 185, which is driven by another driving motor 186.

Since the throttle valves 182 of the activation side and deactivation side throttle bodies 161 and 162 are controlled independently of each other by the driving motors 186 in this manner, also it is possible to make opening characteristics of the throttle valves 182 of the front and rear cylinder blocks 152F and 152R coincide with each other or to conversely make the opening characteristics independent of each other. It is to be noted that, while, in the present embodiment, the driving motor 186 is provided for each of the activation side and deactivation side throttle bodies 161 and 162, provision of the driving motor 186 is not limited to this. In particular, the driving motor 186 may be provided for one of the activation side and deactivation side throttle bodies 161 and 162 while a conventional manual driving mechanism is used for the other one of the activation side and deactivation side throttle bodies 161 and 162 to control the throttle openings of the front and rear cylinder blocks 152F and 152R so as to coincide with each other or be independent of each other.

In control of the engine 150 in the present embodiment, when the engine 150 operates in an all-cylinder operation wherein all of the four cylinders are activated, the driving motors 186, 186 are controlled so that the throttle valve 182 of the activation side and deactivation side throttle bodies 161 and 162 of the front and rear cylinder blocks 152F and 152R are opened and closed in synchronism with each other. Consequently, for example, fuel supply by injectors 183 and ignition by ignition plugs 146 (refer to FIG. 11) are carried out in a normal manner.

On the other hand, in a partial-cylinder operation wherein the two cylinders of the activation cylinder group of the front cylinder block 152F are activated and the two cylinders of the deactivation cylinder group of the rear cylinder block 152R are deactivated, the following control is carried out. In particular, in the front cylinder block 152F, opening and closing control of the throttle valves 182 and fuel supply by injectors 183 and ignition by the ignition plugs 146 are carried out as described above. In the rear cylinder block 152R, although fuel supply and ignition by the ignition plugs 146 are stopped, the throttle valves 182 are controlled to open and close in synchronism with the throttle valves 182 of the front cylinder block 152F as seen in FIG. 4 in order to reduce engine driving loss by pumping. Accordingly, upon partial cylinder operation, air passing the rear cylinder block 152R is discharged to the exhaust system 518 without being used for combustion.

The air cleaner 170 includes an air cleaner case 171 having a single chamber 172, and an element 173 accommodated in the air cleaner case 171 for purifying intake air. The chamber 172 is partitioned into a dirty chamber 172a on the upper side and a clean chamber 172b on the lower side by the element 173.

A partition wall 174 is formed in the air cleaner case 171 such that it extends from a bottom portion 171a of the clean chamber 172b toward the element 173. The partition wall 174 partitions the clean chamber 172b into an activation side space S1 which is a space on the activation cylinder group C1 side and a deactivation side space S2 which is a space on the deactivation cylinder group C2 side. It is to be noted that the activation side space S1 is communicated with the activation side throttle body 161 connected to the activation cylinder group C1 while the deactivation side space S2 is communicated with the deactivation side throttle body 162 connected to the deactivation cylinder group C2.

A blow-by gas returning pipe 175 is provided in the intake system 160 and connects an internal space of the engine 150 and the activation side space S1 of the air cleaner 170. The blow-by gas returning pipe 175 is connected at the upstream end thereof to an outlet 157a of the cylinder head cover 157F of the front cylinder block 152F and at the downstream end thereof to an inlet 171c of a front wall portion 171b of the air cleaner case 171. The inlet 171c is formed such that it is communicated with the activation side space S1 and is open toward the partition wall 174.

As described above, with the intake system 160 of the present embodiment, the partition wall 174 that partitions the chamber 172 into the activation side space S1 and the deactivation side space S2 is provided in the air cleaner 170. Further, the blow-by gas returning pipe 175 that connects the internal space of the engine 150 and the activation side space S1 to each other is provided. Therefore, blow-by gas introduced into the air cleaner 170 can be fed only into the activation cylinder group C1 without being fed into the deactivation cylinder group C2 to purify the blow-by gas with certainty. Further, since blow-by gas can be fed into the activation cylinder group C1 by a simple and easy structure, change of the existing piping configuration can be minimized.

Further, with the intake system 160 of the present embodiment, the partition wall 174 is formed such that it extends from the bottom portion 171a of the clean chamber 172b of the air cleaner 170 toward the element 173, and the blow-by gas returning pipe 175 is connected to the activation side space S1 of the clean chamber 172b. Therefore, the activation side space S1 and the deactivation side space S2 can be separated from each other only by partitioning the clean chamber 172b by the partition wall 174. Consequently, change of the air cleaner 170 can be minimized.

Further, with the intake system 160 of the present embodiment, since the inlet 171c of the blow-by gas returning pipe 175 is provided so as to be directed to the partition wall 174, blow-by gas can be prevented from being injected directly to the element 173. Consequently, since progress of the dirt to the element 173 can be suppressed, the maintenance cycle of the element 173 can be elongated.

Further, with the intake system 160 of the present embodiment, since the blow-by gas returning pipe 175 is connected at the upstream end thereof to the front cylinder block 152F of the activation cylinder group C1 side, blow-by gas from the activation cylinder group C1 can be emitted positively and rapidly. Consequently, the purification efficiency of blow-by gas can be raised.

Further, with the intake system 160 of the present embodiment, the air cleaner 170 is disposed directly above the front cylinder block 152F and the blow-by gas returning pipe 175 is connected at the upstream end thereof to the cylinder head cover 157F of the activation cylinder group C1 side and at the downstream end thereof to the activation side space S1 of the air cleaner 170. Therefore, the blow-by gas returning pipe 175 can shortened.

Now, an intake system for a variable cylinder engine according to a second embodiment of the present invention is described with reference to FIGS. 15 and 16. It is to be noted that like or equivalent portions to those of the first embodiment illustrated in FIGS. 10-14 are denoted by like reference characters in the figures and description of them is omitted or simplified.

Figure 15:
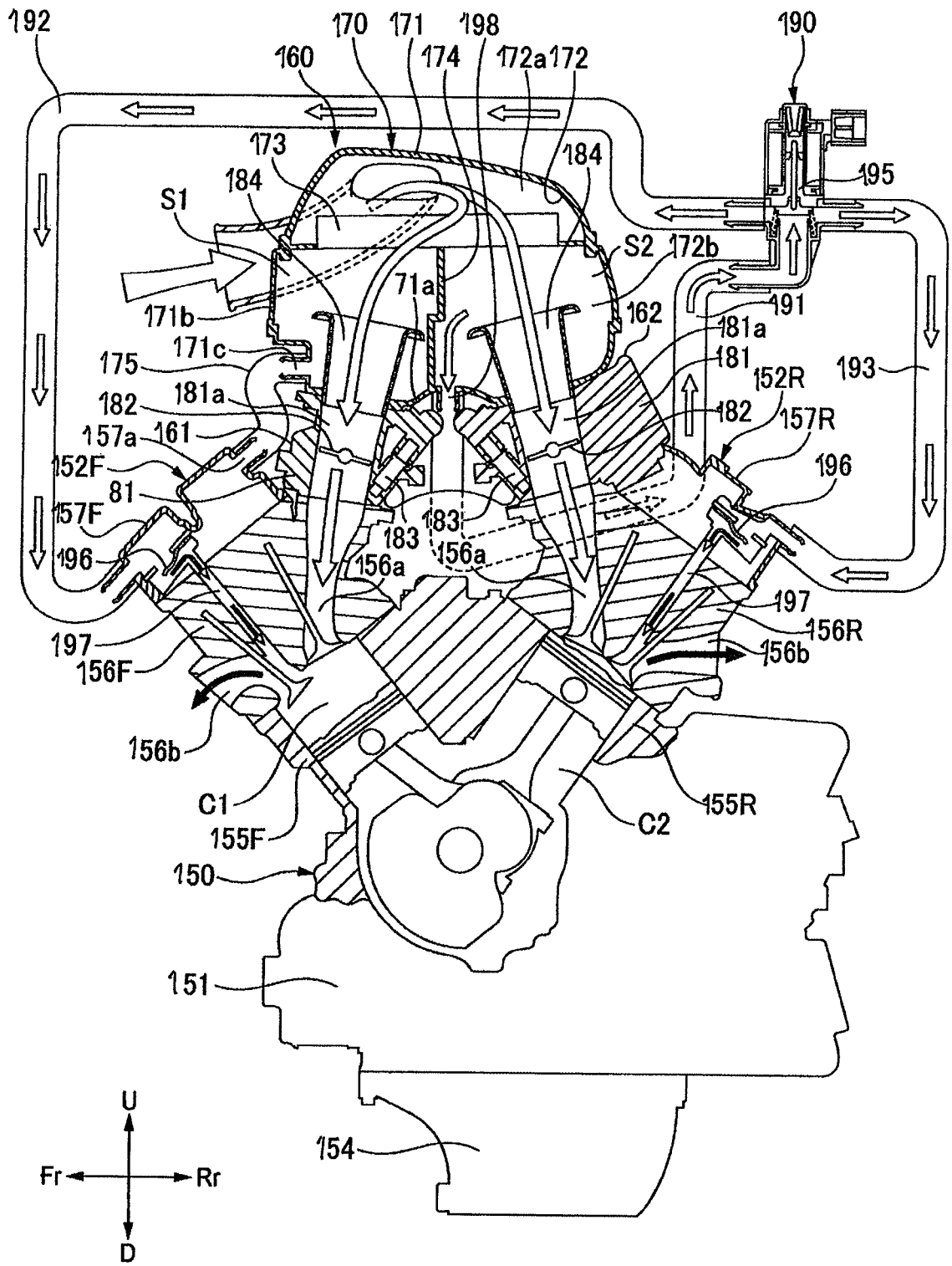
FIG. 15 is a left side elevational view depicting an intake system for a variable cylinder engine according to a second embodiment of the present invention.
Figure 16:
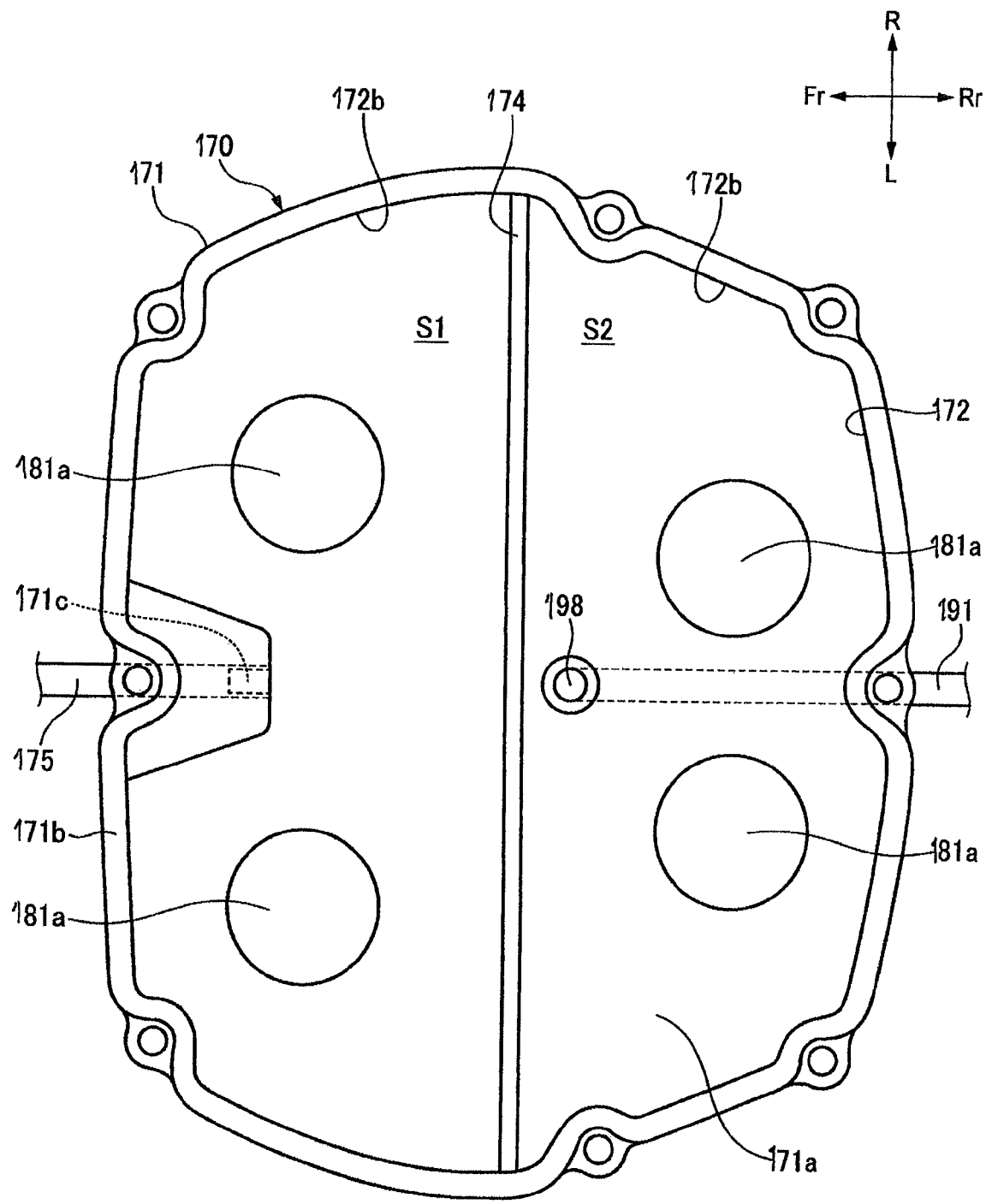
FIG. 16 is a top plan view of an air cleaner case shown in FIG. 7.

In the present embodiment, the engine 150 includes a secondary air supplying apparatus 190 for introducing fresh air into exhaust ports 156b, 156b of the front cylinder block 152F and the rear cylinder block 152R as shown in FIGS. 15 and 16.

The secondary air supplying apparatus 190 includes a first pipe 191 connected to the deactivation side space S2 of the clean chamber 172b of the air cleaner 170, and a solenoid valve 195 connected to the downstream end of the first pipe 191. The secondary air supplying apparatus 190 further includes a second pipe 192 that connects the solenoid valve 195 and the cylinder head cover 157F of the front cylinder block 152F to each other, and a third pipe 193 that connects the solenoid valve 195 and the cylinder head cover 157R of the rear cylinder block 152R to each other. The secondary air supplying apparatus 190 further includes reed valves 196, 196 provided in the cylinder head cover 157F and the cylinder head cover 157R, and second air supplying passages 197, 197 formed in the front cylinder block 152F and the rear cylinder block 152R and connecting the reed valves 196 and the exhaust port 156b to each other.

Further, in the present embodiment, an air intake opening 198 to which the upstream end of the first pipe 191 is connected is formed adjacent the partition wall 174 on the deactivation side space S2 side of the bottom portion 171a of the air cleaner case 171. Further, the inlet 171c to which the upstream end of the blow-by gas returning pipe 175 is connected is formed at a lower end portion of the front wall portion 171b of the air cleaner case 171, namely, in the proximity of the bottom portion 171a of the front wall portion 171b.

As described above, with the intake system 160 of the present embodiment, the engine 150 includes the secondary air supplying apparatus 190 for introducing fresh air into the exhaust ports 156b, 156b, and the air intake opening 198 of the secondary air supplying apparatus 190 is provided for the deactivation side space S2 of the air cleaner 170. Therefore, blow-by gas can be prevented from flowing to the exhaust port 156b of the deactivation cylinder group C2 side through the secondary air supplying apparatus 190.

Further, with the intake system 160 of the present embodiment, the inlet 171c of the blow-by gas returning pipe 175 is provided in the proximity of the bottom portion 171a of the air cleaner 170, and the air intake opening 198 of the secondary air supplying apparatus 190 is provided on the bottom portion 171a of the air cleaner 170. Therefore, blow-by gas can be prevented from flowing into the air intake opening 198 of the secondary air supplying apparatus 190.

Any other configurations and operational effects are the same as those of the above described first embodiment as illustrated in FIGS. 10-14.

It is to be noted that the present invention is not limited to those described hereinabove as the embodiments but can be altered suitably without departing from the subject matter of the present invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An exhaust system for a variable cylinder engine comprising:
    a variable cylinder engine having an activation cylinder group operating normally and a deactivation cylinder group wherein a fuel supply is stopped under a particular condition;
    an activation side exhaust pipe connected to the activation cylinder group;
    a deactivation side exhaust pipe connected to the deactivation cylinder group;
    a gathering section connected to downstream ends of the activation side exhaust pipe and the deactivation side exhaust pipe;
    a sub-catalyst disposed in the activation side exhaust pipe; and a main catalyst disposed at the gathering section, wherein:
the main catalyst is formed such that gas passing therethrough is partitioned into flows independent of each other in a flow path direction;
the activation side exhaust pipe and the deactivation side exhaust pipe are connected in a mutually independent state to the main catalyst;
said sub-catalyst includes an external cylinder member configuring a shell thereof; and
a downstream end of the external cylinder member abuts with an upstream end of the main catalyst.

2. The exhaust system for a variable cylinder engine according to claim 1, wherein the main catalyst is formed in a flattened cross sectional shape to span in an array direction of the downstream ends of the activation side exhaust pipe and the deactivation side exhaust pipe.

3. The exhaust system for a variable cylinder engine according to claim 2, wherein:
a partition wall partitions the portion at which the activation side exhaust pipe is connected and the portion at which the deactivation side exhaust pipe is connected from each other, said partition wall being provided at the gathering section; and
a downstream end of the partition wall abuts with an upstream end of the main catalyst.

4. The exhaust system for a variable cylinder engine according to claim 2, wherein:
the engine has a front cylinder block and a rear cylinder block disposed in a V-shape;
the activation cylinder group is incorporated in the front cylinder block; and
the gathering section is disposed below the variable cylinder engine.

5. The exhaust system for a variable cylinder engine according to claim 1, wherein:
a partition wall partitions the portion at which the activation side exhaust pipe is connected and the portion at which the deactivation side exhaust pipe is connected from each other, said partition wall being provided at the gathering section; and
a downstream end of the partition wall abuts with an upstream end of the main catalyst.

6. The exhaust system for a variable cylinder engine according to claim 1, wherein:
the activation side exhaust pipe includes a plurality of upstream side exhaust pipes connected to the cylinders of the activation cylinder group and an activation side gathering section connected to a downstream end of the upstream side exhaust pipes; and
the sub-catalyst is disposed at the activation side gathering section.

7. The exhaust system for a variable cylinder engine according to claim 6, wherein the activation side gathering section is configured as a separate member from the upstream side exhaust pipes.

8. The exhaust system for a variable cylinder engine according to claim 1, wherein:
the engine has a front cylinder block and a rear cylinder block disposed in a V-shape;
the activation cylinder group is incorporated in the front cylinder block; and
the gathering section is disposed below the variable cylinder engine.

* * * * *